US011669453B2

(12) United States Patent
Liu

(10) Patent No.: US 11,669,453 B2
(45) Date of Patent: Jun. 6, 2023

(54) DATA PREFETCHING METHOD AND APPARATUS

(71) Applicant: HUAWEI TECHNOLOGIES CO., LTD., Guangdong (CN)

(72) Inventor: Tao Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/182,401

(22) Filed: Feb. 23, 2021

(65) Prior Publication Data

US 2021/0224189 A1 Jul. 22, 2021

Related U.S. Application Data

(63) Continuation of application No. PCT/CN2019/102285, filed on Aug. 23, 2019.

(30) Foreign Application Priority Data

Aug. 24, 2018 (CN) ......................... 201810974252.2
Mar. 29, 2019 (CN) ......................... 201910259338.1

(51) Int. Cl.
*G06F 12/08* (2016.01)
*G06F 12/0811* (2016.01)
(Continued)

(52) U.S. Cl.
CPC ...... *G06F 12/0811* (2013.01); *G06F 12/0238* (2013.01); *G06F 12/0813* (2013.01); *G06F 12/0862* (2013.01)

(58) Field of Classification Search
CPC ............. G06F 12/0811; G06F 12/0238; G06F 12/0813; G06G 12/0862
See application file for complete search history.

(56) References Cited

U.S. PATENT DOCUMENTS 6,954,767 B1 10/2005 Kanada
7,124,252 B1 * 10/2006 Khare ................ G06F 12/0831 710/39
(Continued)

FOREIGN PATENT DOCUMENTS

CN 1506849 A 6/2004
CN 1652091 A 8/2005
(Continued)

OTHER PUBLICATIONS

Ssu-Hsuan Lu, Chun-Chieh Yang, Hsiao-Hsi Wang and Kuan-Ching Li, "On design of agent home scheme for prefetching strategy in DSM systems," 19th International Conference on Advanced Information Networking and Applications (AINA'05) vol. 1 (AINA papers), 2005, pp. 693-698.*
(Continued)

*Primary Examiner* — Pierre Michel Bataille
(74) *Attorney, Agent, or Firm* — Womble Bond Dickinson (US) LLP

(57) ABSTRACT

This application discloses a data prefetching method, including: receiving, by a home node, a write request sent by a first cache node after the first cache node processes received data; performing, by the home node, an action of determining whether the second cache node needs to perform a data prefetching operation on the to-be-written data; and when determining that the second cache node needs to perform a data prefetching operation on the to-be-written data, sending, by the home node, the to-be-written data to the second cache node. Embodiments of this application help improve accuracy and certainty of a data prefetching time point, and reduce a data prefetching delay.

18 Claims, 14 Drawing Sheets

(51) Int. Cl.

| | |
|---|---|
| ***G06F 12/02*** | (2006.01) |
| ***G06F 12/0813*** | (2016.01) |
| ***G06F 12/0862*** | (2016.01) |

(56) References Cited

U.S. PATENT DOCUMENTS

| | | | | |
|---|---|---|---|---|
| 10,802,969 | B2* | 10/2020 | Waugh | G06F 12/0811 |
| 2003/0009632 | A1 | 1/2003 | Arimilli et al. | |
| 2003/0009635 | A1* | 1/2003 | Arimilli | G06F 12/0813 711/141 |
| 2004/0148473 | A1 | 7/2004 | Hughes et al. | |
| 2006/0085602 | A1 | 4/2006 | Huggahalli et al. | |
| 2006/0101209 | A1* | 5/2006 | Lais | G06F 12/082 711/146 |
| 2016/0357779 | A1 | 12/2016 | Jaakola et al. | |
| 2017/0353576 | A1* | 12/2017 | Guim Bernat | H04L 67/2847 |
| 2018/0165204 | A1* | 6/2018 | Venkatesh | G06F 12/084 |
| 2018/0225216 | A1 | 8/2018 | Filippo et al. | |
| 2020/0250094 | A1* | 8/2020 | Waugh | G06F 12/0862 |

FOREIGN PATENT DOCUMENTS

| | | | |
|---|---|---|---|
| CN | 101082861 | A | 12/2007 |
| CN | 103635887 | A | 3/2014 |
| EP | 0818733 | A2 | 1/1998 |
| EP | 2555129 | A1 | 2/2013 |

OTHER PUBLICATIONS

Hazim Abdel-Shafi, Jonathan Hall, Sarita V. Adve, Vikram S. Adve, "An Evaluation of Fine-Grain Producer-Initiated Communication in Cache-Coherent Multiprocessors", High-Performance Computer Architecture, 1997., Third International Symposi on Electrical & Computer Engineering / Computer Science, 1997, pp. 204-215.*

* cited by examiner

DATA PREFETCHING METHOD AND APPARATUS

CROSS-REFERENCE TO RELATED APPLICATIONS

This application is a continuation of International Application No. PCT/CN2019/102285, filed on Aug. 23, 2019, which claims priority to Chinese Patent Application No. 201810974252.2, filed on Aug. 24, 2018 and Chinese Patent Application No. 201910259338.1, filed on Mar. 29, 2019. The disclosures of the aforementioned applications are hereby incorporated by reference in their entireties.

TECHNICAL FIELD

This application relates to the communications field, and in particular, to a data prefetching method and apparatus.

BACKGROUND

A multi-core (including multi-processor) system generally has a plurality of levels of caches, and is configured to store, for example, a program instruction, process data of program execution, or data frequently referenced in a next-level cache. One or more pieces of data in a lower-level cache may hold a copy in each upper-level cache. When a data copy at a specific level changes, a cache coherence mechanism may be used to ensure coherence of same data cached at a plurality of levels. That is, the cache coherence mechanism may maintain and ensure coherence of data in different positions and different caches by propagating a data change message in a multi-core system.

Each processor kernel includes a local cache and a hardware module that maintains coherence between the local caches. The hardware module and the local cache are collectively referred to as a cache node, and the processor kernel is referred to as a computing node.

Cache coherence is mainly applied to a multi-core central processing unit (CPU) system, and data prefetching (that is, instruction preprocessing) is specific to a specific CPU core in the multi-core CPU system. Data prefetching is analyzing consecutive adjacent instructions in a specific CPU core based on locality of program execution; predicting an instruction that is likely to be executed at a next time point, to obtain related to-be-processed data from a memory in advance based on a prediction result; and eliminating a delay of the data on a transmission path based on an advance of data obtaining, to reduce an overall system processing delay. However, this manner has the following disadvantages: 1. Instruction prediction is limited to only a same cache node, and data required by an instruction that may be executed subsequently can be predicted only by analyzing N consecutive instructions of a current cache node; consequently, a time point at which data prefetching is initiated is indefinite. 2. A prefetching result is indefinite: Although accuracy of a prediction result may usually be improved by predicting a plurality of instructions, the accuracy cannot reach 100%. 3. A larger delay is caused: When a plurality of cache nodes collaborate, other cache nodes can prefetch correct data based on an instruction only after a specific cache node processes the instruction and has updated data. As shown in FIG. 1*a*, after generating new data, a cache node 1 needs to write the data to a home node, and sends a data write request to the home node. To obtain the data generated by the cache node 1, a cache node 2 needs to wait until the home node starts to process the data reading request of the cache node 2 after executing an instruction of the cache node 1 (that is, in FIG. 1*a*, a time period from receiving the data reading request by the home node to sending the first response message is a blocking time period), and an extra delay is generated when the home node processes the data reading request, for example, time represented by a gray rectangle in FIG. 1*a*.

SUMMARY

Embodiments of this application provide a data prefetching method and apparatus, to help improve accuracy of a data prefetching time point and determine certainty of a prediction result, and to reduce a data prefetching delay.

According to a first aspect, an embodiment of this application provides a data prefetching method. The method is applied to a data prefetching system. The data prefetching system includes a home node and a plurality of cache nodes. The method includes:

receiving, by the home node, a write request sent by a cache node 1, where the write request carries to-be-written data, a data prefetching identifier, and a data prefetching node number; sending, by the home node based on the data prefetching identifier, a first snooping message to a cache node 2 indicated by the data prefetching node number, where the first snooping message carries a prefetching inquiry identifier, and the prefetching inquiry identifier is used to indicate whether the cache node 2 needs to perform an operation of: determining whether the cache node 2 needs to perform a data prefetching operation on the to-be-written data; receiving, by the home node, a first snooping response message sent by the cache node 2, where the first snooping response message includes indication information used to indicate whether the cache node 2 needs to perform the data prefetching operation on the to-be-written data; and when the home node determines that the cache node 2 needs to perform the data prefetching operation on the to-be-written data, sending, by the home node to the cache node 2, a response message carrying the to-be-written data. The cache node 1 and the cache node 2 are two different nodes in the plurality of cache nodes.

It should be noted herein that, that the cache node 1 sends the write request to the home node is specifically that the cache node 1 sends the write request to the home node after processing the received data. The to-be-written data is data obtained after the cache node 1 processes the received data.

The first snooping response message is sent after the cache node 2 determines, based on the prefetching inquiry identifier, whether a data prefetching operation needs to be performed on the to-be-written data.

In the prior art, the home node predicts, based on one or more historical instructions, whether the cache node needs to prefetch data. Because a prediction manner is used, a time point at which the cache node prefetches data is indefinite, and a result about whether the cache node prefetches data is indefinite. However, in this application, after receiving the write request from the cache node 1, the home node sends a snooping message to the cache node 2, to inquire whether the cache node 2 needs to prefetch data. If the cache node 2 needs to prefetch data, the home node sends the data to the cache node 2. Compared with a manner of predicting, based on an instruction, whether a cache node needs to prefetch data in the prior art, in this application, the cache node is directly inquired whether the cache node needs to prefetch data; if the cache node needs to prefetch data, the data is sent to the cache node. The manner of this application helps make a result about whether to prefetch data and a prefetching time point more accurate, and is not limited to one cache node. In addition, a delay is reduced.

In one embodiment, the indication information is a first prefetching result identifier included in the first snooping response message, and different values of the first prefetching result identifier are used to indicate whether the cache node 2 needs to perform the data prefetching operation on the to-be-written data (for example, when a value of the first prefetching result identifier is a first preset threshold, it indicates that the cache node 2 needs to perform the data prefetching operation on the to-be-written data; when a value of the second prefetching result identifier is a second preset threshold, it indicates that the cache node does not need to perform the data prefetching operation on the to-be-written data). Alternatively, the indication information is information indicating, depending on whether the first snooping response message includes a second prefetching result identifier, whether the cache node 2 needs to perform the data prefetching operation on the to-be-written data (for example, when the first snooping response message includes the second prefetching result identifier, it indicates that the cache node 2 needs to perform the data prefetching operation on the to-be-written data; when the first snooping response message does not include a second prefetching result identifier, it indicates that the cache node 2 does not need to perform the data prefetching operation on the to-be-written data). Compared with the manner of predicting, based on an instruction, whether data needs to be prefetched, the manner of informing, based on the indication information, the home node whether the cache node 2 needs to perform the data prefetching operation on the to-be-written data is more accurate, and does not generate an error.

In one embodiment, the data prefetching system further includes a plurality of computing nodes, and the plurality of computing nodes one-to-one correspond to the plurality of cache nodes. A computing node corresponding to the cache node 1 is configured to perform a first operation on received data, and a computing node corresponding to the cache node 2 is configured to perform a second operation on the received data. There is a high probability that the second operation is performed on the received data after the first operation is performed on the received data.

That there is a high probability that the second operation is performed on the received data after the first operation is performed on the received data includes: the cache node 1 may determine, based on a type of the received data, that there is a high probability that the second operation is performed on the received data after the first operation is performed on the received data. Alternatively, the cache node 1 determines, based on a procedure of processing the received data, that there is a high probability that the second operation is performed on the received data after the first operation is performed on the received data. Alternatively, the cache node 1 determines, based on an actual hardware resource, that there is a high probability that the second operation is performed on the received data after the first operation is performed on the received data. For example, a user purchases only a storage resource when purchasing a cloud resource, and therefore, only stores a packet after receiving the packet.

It should be noted that, for the cache node 1, the received data is data sent by the computing node corresponding to the cache node 1; for the cache node 2, the received data is data obtained after the cache node 1 processes the received data.

Because the cache node 1 learns that there is a high possibility that the cache node 2 performs the second operation on the to-be-written data, after receiving the write request from the cache node 1, the home node directly sends a snooping request to the cache node 2, to inquiry whether the cache node 2 needs to perform the data prefetching operation on the to-be-written data. If the home node determines that the cache node 2 needs to perform the data prefetching operation on the to-be-written data, the home node sends the to-be-written data to the cache node 2. The cache node 2 can obtain the to-be-written data as early as possible, thereby improving efficiency.

In one embodiment, the data prefetching system further includes a storage node, the write request further includes a data write address, and the data write address is a storage address that is in the storage node when the to-be-written data is written to the storage node. The method further includes: if the home node determines, based on the indication information, that the cache node 2 does not need to perform a data prefetching operation on the to-be-written data, caching, by the home node, the to-be-written data and the data write address into a cache of the home node. The data write address is a storage address of the to-be-written data in the storage node. An objective of storing the to-be-written data by the home node is that, when the cache node needs to read the to-be-written data subsequently, the home node can directly send the to-be-written data to a cache node that requires the to-be-written data, with no need to send a data reading request to another cache node to request to obtain the to-be-written data. In this way, a data reading rate is increased.

In one embodiment, when the home node respectively sends the completion message and a response message to the cache node 1 and the cache node 2, the home node sends a data update message to the storage node, to update the to-be-written data to storage space in the storage node that corresponds to the data write address. In this way, in addition to saving the storage space of the home node, data in the space corresponding to the data write address in the storage node can be updated in time, so that when subsequently reading the data in the space corresponding to the data write address, the cache node can ensure that all obtained data is latest.

In one embodiment, when the home node sends the first snooping message to the cache node 2, the method further includes: sending, by the home node, a second snooping message to another cache node, where the second snooping message is used to indicate the another cache node to delete raw data, and the raw data is data corresponding to the data write address before the home node receives the to-be-written data. The another cache node is a cache node in the plurality of cache nodes except the cache node 1 and the cache node 2. An objective of sending, by the home node to another cache node, a second snooping message used to indicate the another cache node to delete raw data is to ensure that data used by the another cache node during a subsequent operation is latest, ensuring correctness of the subsequent operation.

In one embodiment, when the home node sends the response message to the cache node 2, the method further includes: sending a completion message to the cache node 1, where the completion message is used to inform the cache node 1 that data writing is completed. In the prior art, the home node can execute an instruction from another cache node only after processing all instructions from a current cache node, resulting in a large delay. However, in this application, because messages are sent to the cache node 1 and the cache node 2 simultaneously, it can be learned that a plurality of instructions are processed in one instruction cycle. In this way, a delay is reduced.

It should be noted that a person skilled in the art may understand that, due to hardware limitation, it is usually impossible to implement 100% simultaneity. Therefore, "simultaneously" in this application does not mean that there is no time difference, but that there is a comparatively small time difference, to ensure that two messages are sent simultaneously as much as possible. In this way, the messages can be transferred to a peer end as soon as possible, to reduce a delay. Specifically, the time difference may be one or more instruction cycles. In addition, a sequence of sending the two messages is not limited either. For example, the home node sends the response message before sending the completion message. Alternatively, the home node sends the completion message before sending the response message.

In one embodiment, the data prefetching system is a processor, and the cache node and the home node each include a cache and a cache control circuit that are in the processor, so as to prefetch data in a processor scenario. The home node exchanges data with the cache node through a cache bus. In terms of a protocol, the home node exchanges data with the cache node based on a cache coherence protocol (such as the modified shared invalid (MSI) protocol and the modified shared invalid forwarding (MSIF) protocol).

Further, the computing node can be a core in the processor, for example, an Advanced RISC Machine (ARM) core or an x86 core.

In one embodiment, the data prefetching system is a cluster computing system, the cluster computing system includes a plurality of processing servers and a storage server, the cache node includes a memory controller and a memory (for example, a double data rate (DDR) controller and a DDR storage medium) that are in a processing server, and the home node includes a processor and a memory that are in the storage server. In this way, data is prefetched in a scenario of the cluster computing system.

Further, the computing node can be a processor of a processing server.

According to a second aspect, an embodiment of this application provides another data prefetching method. The method is applied to a data prefetching system. The data prefetching system includes a plurality of cache nodes and a home node. The method includes:

receiving, by a cache node 2, a first snooping message sent by the home node, where the first snooping message carries a prefetching inquiry identifier, the prefetching inquiry identifier is used to indicate the cache node 2 to perform an operation of determining whether a data prefetching operation needs to be performed on to-be-written data, the to-be-written data is data obtained after the cache node 1 processes received data, and the cache node 1 and the cache node 2 are two different nodes in the plurality of cache nodes; determining, by the cache node 2 based on the prefetching inquiry identifier, whether the cache node 2 needs to perform the data prefetching operation on the to-be-written data; sending a first snooping response message to the home node, where the first snooping response message includes indication information used to indicate whether the cache node 2 needs to perform the data prefetching operation on the to-be-written data; and if the cache node 2 determines that the cache node 2 needs to perform the data prefetching operation on the to-be-written data, after the cache node 2 sends the first snooping response message to the home node, receiving a response message sent by the home node, where the response message carries the to-be-written data. Compared with a manner of predicting, based on an instruction, whether to prefetch data, a manner of determining, in a manner similar to a handshake manner, whether to perform a data prefetching operation helps make a result about whether to prefetch data and a prefetching time point more accurate, is not limited to one cache node, and reduces a delay.

In one embodiment, the data prefetching system further includes a plurality of computing nodes, and the plurality of computing nodes one-to-one correspond to the plurality of cache nodes. A computing node corresponding to the cache node 1 is configured to perform a first operation on received data, and a computing node corresponding to the cache node 2 is configured to perform a second operation on the received data. There is a high probability that the second operation is performed on the received data after the first operation is performed on the received data.

That there is a high probability that the second operation is performed on the received data after the first operation is performed on the received data includes: the cache node 1 may determine, based on a type of the received data, that there is a high probability that the second operation is performed on the received data after the first operation is performed on the received data. Alternatively, the cache node 1 determines, based on a procedure of processing the received data, that there is a high probability that the second operation is performed on the received data after the first operation is performed on the received data. Alternatively, the cache node 1 determines, based on an actual hardware resource, that there is a high probability that the second operation is performed on the received data after the first operation is performed on the received data. For example, a user purchases only a storage resource when purchasing a cloud resource, and therefore, only stores a packet after receiving the packet.

It should be noted that, for the cache node 1, the received data is data sent by the computing node corresponding to the cache node 1; for the cache node 2, the received data is data obtained after the cache node 1 processes the received data.

Because the cache node 1 learns that there is a high possibility that the cache node 2 performs the second operation on the to-be-written data, after receiving the write request from the cache node 1, the home node directly sends a snooping request to the cache node 2, to inquiry whether the cache node 2 needs to perform the data prefetching operation on the to-be-written data. If the home node determines that the cache node 2 needs to perform the data prefetching operation on the to-be-written data, the home node sends the to-be-written data to the cache node 2. The cache node 2 can obtain the to-be-written data as early as possible, thereby improving efficiency.

In one embodiment, the determining, by the cache node 2 based on the prefetching inquiry identifier, whether the cache node 2 needs to perform the data prefetching operation on the to-be-written data includes: if the cache node 2 supports a data prefetching function and requires the to-be-written data, determining, by the cache node 2, that the cache node 2 needs to perform the data prefetching operation on the to-be-written data; or if the cache node 2 supports a data prefetching function but does not require the to-be-written data, or the cache node 2 does not support a data prefetching function, determining, by the cache node 2, that the cache node 2 does not need to perform a data prefetching operation on the to-be-written data.

In one embodiment, the indication information is a first prefetching result identifier included in the first snooping response message, and different values of the first prefetching result identifier are used to indicate whether the cache node 2 needs to perform the data prefetching operation on the to-be-written data (for example, when a value of the first prefetching result identifier is a first preset threshold, it indicates that the cache node 2 needs to perform the data prefetching operation on the to-be-written data; when a value of the second prefetching result identifier is a second preset threshold, it indicates that the cache node does not need to perform the data prefetching operation on the to-be-written data). Alternatively, the indication information is information indicating, depending on whether the first snooping response message includes a second prefetching result identifier, whether the cache node 2 needs to perform the data prefetching operation on the to-be-written data (for example, when the first snooping response message includes the second prefetching result identifier, it indicates that the cache node 2 needs to perform the data prefetching operation on the to-be-written data; when the first snooping response message does not include a second prefetching result identifier, it indicates that the cache node 2 does not need to perform the data prefetching operation on the to-be-written data).

In one embodiment, the data prefetching system is a processor, and the cache node and the home node each include a cache and a cache control circuit that are in the processor, so as to prefetch data in a processor scenario. The home node exchanges data with the cache node through a cache bus. In terms of a protocol, the home node exchanges data with the cache node based on a cache coherence protocol (such as the MSI protocol and the MSIF protocol).

Further, the computing node can be a core in the processor, for example, an ARM core or an x86 core.

In one embodiment, the data prefetching system is a cluster computing system, the cluster computing system includes a plurality of processing servers and a storage server, the cache node includes a memory controller and a memory (for example, a DDR controller and a DDR storage medium) that are in a processing server, and the home node includes a processor and a memory that are in the storage server. In this way, data is prefetched in a scenario of the cluster computing system.

Further, the computing node can be a processor of a processing server.

According to a third aspect, an embodiment of this application further provides a home node. The home node is applied to a data prefetching system. The data prefetching system further includes a plurality of cache nodes. The home node includes:

a receiving unit, configured to receive a write request sent by a cache node 1, where the write request carries to-be-written data, a data prefetching identifier, and a data prefetching node number;

a sending unit, configured to send, based on the data prefetching identifier, a first snooping message to a cache node 2 indicated by the data prefetching node number, where the first snooping message carries a prefetching inquiry identifier, and the prefetching inquiry identifier is used to indicate the cache node 2 to perform an operation of determining whether the cache node 2 needs to perform a data prefetching operation on the to-be-written data, and the cache node 1 and the cache node 2 are two different nodes in the plurality of cache nodes; where the receiving unit is further configured to receive a first snooping response message sent by the cache node 2, where the first snooping response message includes indication information used to indicate whether the cache node 2 needs to perform the data prefetching operation on the to-be-written data; and a determining unit, configured to determine, based on the indication information, whether the cache node 2 needs to perform the data prefetching operation on the to-be-written data; where the sending unit is further configured to: when the determining unit determines, based on the indication information, that the cache node 2 needs to perform the data prefetching operation on the to-be-written data, send, to the cache node 2, a response message carrying the to-be-written data.

It should be noted herein that, that the cache node 1 sends the write request to the home node is specifically that the cache node 1 sends the write request to the home node after processing the received data. The to-be-written data is data obtained after the cache node 1 processes the received data.

The first snooping response message is sent after the cache node 2 determines, based on the prefetching inquiry identifier, whether a data prefetching operation needs to be performed on the to-be-written data.

In one embodiment, the indication information is a first prefetching result identifier included in the first snooping response message, and different values of the first prefetching result identifier are used to indicate whether the cache node 2 needs to perform the data prefetching operation on the to-be-written data (for example, when a value of the first prefetching result identifier is a first preset threshold, it indicates that the cache node 2 needs to perform the data prefetching operation on the to-be-written data; when a value of the second prefetching result identifier is a second preset threshold, it indicates that the cache node does not need to perform the data prefetching operation on the to-be-written data). Alternatively, the indication information is information indicating, depending on whether the first snooping response message includes a second prefetching result identifier, whether the cache node 2 needs to perform the data prefetching operation on the to-be-written data (for example, when the first snooping response message includes the second prefetching result identifier, it indicates that the cache node 2 needs to perform the data prefetching operation on the to-be-written data; when the first snooping response message does not include a second prefetching result identifier, it indicates that the cache node 2 does not need to perform the data prefetching operation on the to-be-written data).

In one embodiment, the data prefetching system further includes a plurality of computing nodes, and the plurality of computing nodes one-to-one correspond to the plurality of cache nodes. A computing node corresponding to the cache node 1 is configured to perform a first operation on received data, and a computing node corresponding to the cache node 2 is configured to perform a second operation on the received data. There is a high probability that the second operation is performed on the received data after the first operation is performed on the received data.

That there is a high probability that the second operation is performed on the received data after the first operation is performed on the received data includes: The cache node 1 may determine, based on a type of the received data, that there is a high probability that the second operation is performed on the received data after the first operation is performed on the received data. Alternatively, the cache node 1 determines, based on a procedure of processing the received data, that there is a high probability that the second operation is performed on the received data after the first operation is performed on the received data. Alternatively, the cache node 1 determines, based on an actual hardware resource, that there is a high probability that the second operation is performed on the received data after the first operation is performed on the received data. For example, a user purchases only a storage resource when purchasing a cloud resource, and therefore, only stores a packet after receiving the packet.

In one embodiment, the data prefetching system further includes a storage node, the write request further includes a data write address, and the data write address is a storage address that is in the storage node when to-be-written data is written to the storage node. The home node further includes:

a cache unit, configured to: when the determining unit determines, based on the indication information, that the cache node 2 does not need to perform a data prefetching operation on the to-be-written data, cache the to-be-written data and the data write address into a cache of the home node.

In one embodiment, the sending unit is further configured to: when sending the first snooping message to the cache node 2, send a second snooping message to another cache node, where the second snooping message is used to indicate the another cache node to delete raw data, and the raw data is data corresponding to the data write address before the home node receives the to-be-written data; and the another cache node is a cache node in the plurality of cache nodes except the cache node 1 and the cache node 2.

In one embodiment, the sending unit is further configured to: when sending the response message to the cache node 2, send a completion message to the cache node 1, where the completion message is used to inform the cache node 1 that data writing is completed.

It should be noted that a person skilled in the art may understand that, due to hardware limitation, it is usually impossible to implement 100% simultaneity. Therefore, "simultaneously" in this application does not mean that there is no time difference, but that there is a comparatively small time difference, to ensure that two messages are sent simultaneously as much as possible. In this way, the messages can be transferred to a peer end as soon as possible, to reduce a delay. Specifically, the time difference may be one or more instruction cycles. In addition, a sequence of sending the two messages is not limited either. For example, the home node sends the response message before sending the completion message. Alternatively, the home node sends the completion message before sending the response message.

In one embodiment, the data prefetching system further includes a storage node, and the sending unit is further configured to:

send a data update message to the storage node, to update the to-be-written data to storage space in the storage node that corresponds to the data write address, where the data update message carries the to-be-written data.

In one embodiment, the data prefetching system is a processor, and the cache node and the home node each include a cache and a cache control circuit that are in the processor. The home node exchanges data with the cache node through a cache bus. In terms of a protocol, the home node exchanges data with the cache node based on a cache coherence protocol (such as the MSI protocol and the MSIF protocol).

Further, the computing node can be a core in the processor, for example, an ARM core or an x86 core.

In one embodiment, the data prefetching system is a cluster computing system, the cluster computing system includes a plurality of processing servers and a storage server, the cache node includes a memory controller and a memory (for example, a DDR controller and a DDR storage medium) that are in a processing server, and the home node includes a processor and a memory that are in the storage server.

Further, the computing node can be a processor of a processing server.

According to a fourth aspect, an embodiment of this application further provides a cache node. The cache node is applied to a data prefetching system. The data prefetching system further includes a home node and a plurality of other cache nodes. The cache node includes:

a receiving unit, configured to receive a first snooping message sent by the home node, where the first snooping message carries a prefetching inquiry identifier, the prefetching inquiry identifier is used to indicate the cache node to perform an operation of determining whether a data prefetching operation needs to be performed on to-be-written data, the to-be-written data is data obtained after a cache node 1 processes received data, and the cache node 1 is one of the plurality of other cache nodes;

a determining unit, configured to determine, based on the prefetching inquiry identifier, whether the determining unit needs to perform a data prefetching operation on the to-be-written data; and a sending unit, configured to send a first snooping response message to the home node, where the first snooping response message includes indication information used to indicate whether the cache node needs to perform the data prefetching operation on the to-be-written data; and the receiving unit is further configured to: if the determining unit determines that the cache node needs to perform the data prefetching operation on the to-be-written data, after the first snooping response message is sent to the home node, receive a response message sent by the home node, where the response message carries the to-be-written data.

In one embodiment, the data prefetching system further includes a plurality of computing nodes, and the plurality of computing nodes one-to-one correspond to the plurality of cache nodes. A computing node corresponding to the cache node 1 is configured to perform a first operation on received data, and a computing node corresponding to the cache node is configured to perform a second operation on the received data. There is a high probability that the second operation is performed on the received data after the first operation is performed on the received data.

That there is a high probability that the second operation is performed on the received data after the first operation is performed on the received data includes: the cache node 1 may determine, based on a type of the received data, that there is a high probability that the second operation is performed on the received data after the first operation is performed on the received data. Alternatively, the cache node 1 determines, based on a procedure of processing the received data, that there is a high probability that the second operation is performed on the received data after the first operation is performed on the received data. Alternatively, the cache node 1 determines, based on an actual hardware resource, that there is a high probability that the second operation is performed on the received data after the first operation is performed on the received data. For example, a user purchases only a storage resource when purchasing a cloud resource, and therefore, only stores a packet after receiving the packet.

In one embodiment, the determining unit is specifically configured to: if the cache node supports a data prefetching function and requires the to-be-written data, determine that the cache node needs to perform the data prefetching operation on the to-be-written data; or if the cache node supports a data prefetching function but does not require the to-be-written data, or the cache node does not support a data prefetching function, determine that the cache node does not need to perform the data prefetching operation on the to-be-written data.

In one embodiment, the indication information is a first prefetching result identifier included in the first snooping response message, and different values of the first prefetching result identifier are used to indicate whether the cache node needs to perform the data prefetching operation on the to-be-written data (for example, when a value of the first prefetching result identifier is a first preset threshold, it indicates that the cache node needs to perform the data prefetching operation on the to-be-written data; when a value of the second prefetching result identifier is a second preset threshold, it indicates that the cache node does not need to perform the data prefetching operation on the to-be-written data). Alternatively, the indication information is information indicating, depending on whether the first snooping response message includes a second prefetching result identifier, whether the cache node needs to perform the data prefetching operation on the to-be-written data (for example, when the first snooping response message includes the second prefetching result identifier, it indicates that the cache node needs to perform the data prefetching operation on the to-be-written data; when the first snooping response message does not include a second prefetching result identifier, it indicates that the cache node does not need to perform the data prefetching operation on the to-be-written data).

In one embodiment, the data prefetching system is a processor, and the cache node and the home node each include a cache and a cache control circuit that are in the processor. The home node exchanges data with the cache node through a cache bus. In terms of a protocol, the home node exchanges data with the cache node based on a cache coherence protocol (such as the MSI protocol and the MSIF protocol).

Further, the computing node can be a core in the processor, for example, an ARM core or an x86 core.

In one embodiment, the data prefetching system is a cluster computing system, the cluster computing system includes a plurality of processing servers and a storage server, the cache node includes a memory controller and a memory (for example, a DDR controller and a DDR storage medium) that are in a processing server, and the home node includes a processor and a memory that are in the storage server.

Further, the computing node can be a processor of a processing server.

It can be learned that, in the solution of the embodiments of this application, after receiving the write request sent by the cache node 1, the home node sends a snooping message to the cache node 2. The prefetching inquiry identifier in the snooping message is used to indicate to cache node 2 to perform the operation of determining whether the data prefetching operation needs to be performed on the to-be-written data in the write request. After replying, to the home node, whether the cache node 2 needs to perform the data prefetching operation on the to-be-written data, the cache node 2 sends a snooping response message to the home node. The snooping response message carries the indication information used to indicate whether the cache node 2 needs to perform the data prefetching operation on the to-be-written data. If determining, based on the indication information, that the cache node 2 needs to perform the data prefetching operation on the to-be-written data, the home node sends a response message to the cache node 2. The response message carries the to-be-written data. According to the embodiments of this application, an application scenario of data prefetching is extended to be not limited to a same cache node, and a data prefetching time point is definite and is the earliest. In addition, data prefetching accuracy is improved, and a data interaction delay is further reduced. When a plurality of cache nodes access a same address, a processing delay may be compressed into a single instruction cycle.

DESCRIPTION OF EMBODIMENTS

The following describes the embodiments of this application with reference to accompanying drawings.

First, a related principle of a cache coherence mechanism in the prior art is described herein.

Each processor kernel includes a local cache and a hardware module that maintains coherence between the local caches. The hardware module and the local cache are collectively referred to as a cache node, and the processor kernel is referred to as a computing node.

There are two types of cache coherence mechanisms: a snooping (snoop)-based coherence mechanism and a directory-based coherence mechanism. In the snooping-based cache coherence mechanism, each cache node (a cache node 1 and a cache node 2 in FIG. 1B) can broadcast a data update request, and another cache node monitors the data update request and determines whether the another cache node holds a data copy corresponding to the data update request. In the snooping-based mechanism, there is a comparatively short delay, and problems about bandwidth occupation and scalability that are caused by continuous data broadcasting are brought. In the directory-based coherence mechanism, data shared between a plurality of cache nodes may be stored in a home node, and the home node may maintain coherence between numerous cache nodes through directory-based recording. When data in a cache node is updated, the home node may update or invalidate an entry, recorded in a directory, of the data on another node, to maintain and manage all data copies in the system on a single node. In this way, data coherence between cache nodes is ensured. The directory-based mechanism can effectively resolve a problem caused by broadcasting in the snooping-based mechanism. However, when updating data, any cache node needs to use a directory and obtain update permissions one by one, resulting in a comparatively large access delay.

Currently, a mechanism combining snooping/directory is usually used to obtain advantages of the foregoing two mechanisms, for example, modified, owned, exclusive, shared, invalid (MOESI) or modified, exclusive, shared, invalid, forwarding (MESIF). A principle of the mechanism combining snooping/directory is described with reference to FIG. 1B.

Figure 1A:
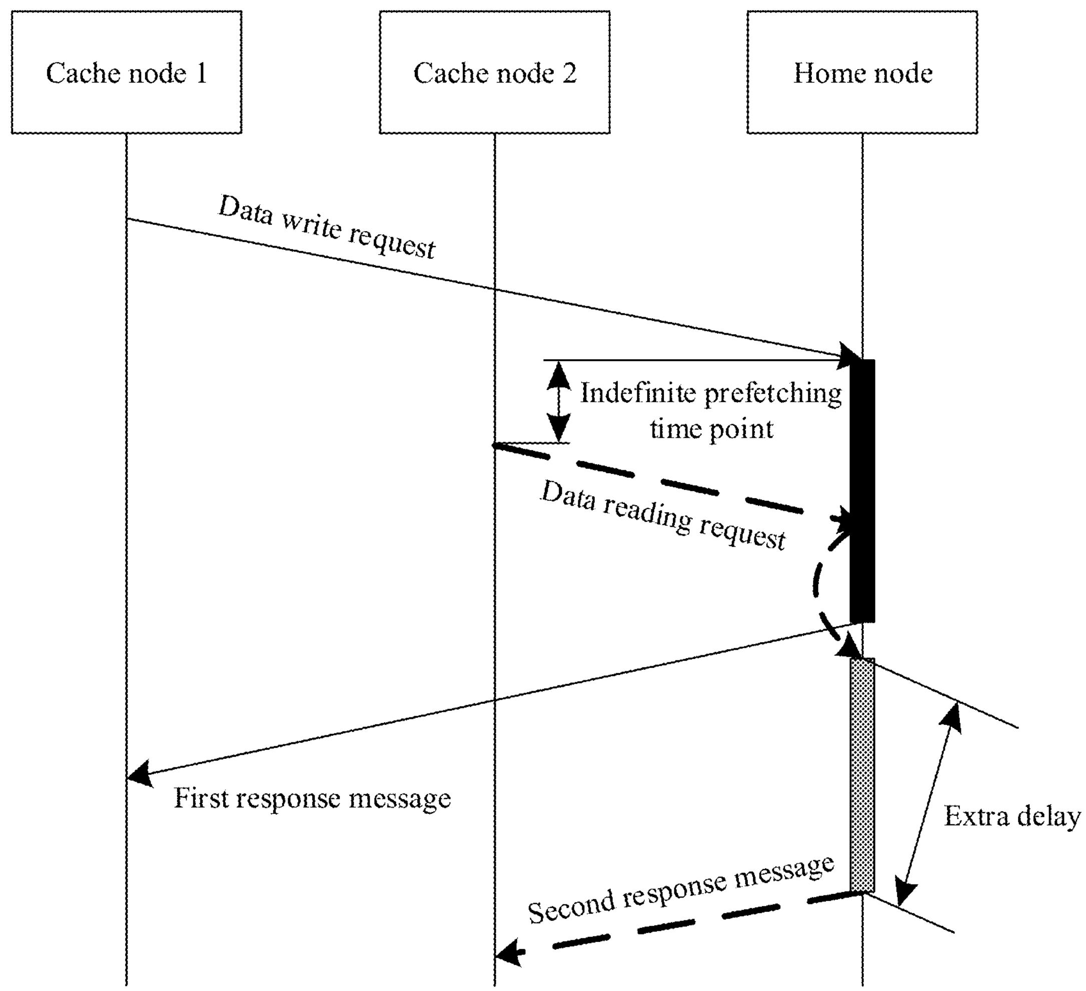
FIG. 1*a* is a schematic flowchart of data prefetching.
Figure 1B:
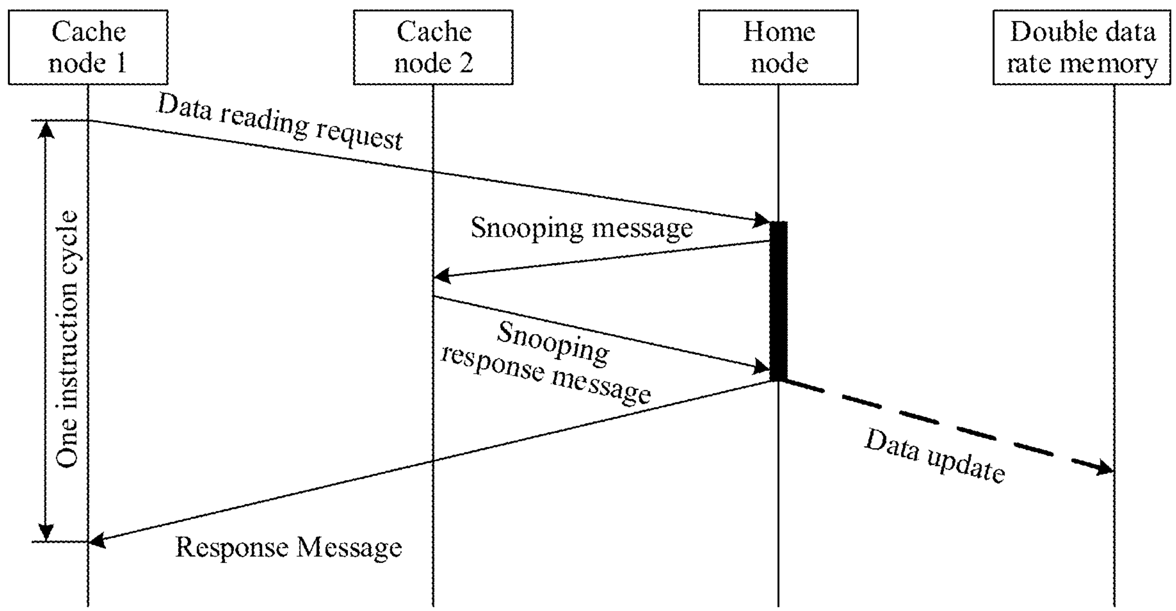
FIG. 1B is a schematic diagram of a method for implementing cache coherence by combining snooping and a directory according to this application.

The cache node 1, the cache node 2, and the home node in FIG. 1B may belong to a same CPU. The home node is a cache coherence maintenance node, and is directly connected to a DDR storage medium.

When the cache node 1 initiates reading of data corresponding to an address of a specific DDR memory, the cache node 1 first sends a data reading request to the home node. After the home node receives the data reading request sent by the cache node 1, the home node broadcasts a snooping message to another cache node (FIG. 1B shows only sending to the cache node 2 for ease of illustration. Actually, the snooping message is also sent to another cache node). The snooping message is used to determine whether another cache node locally stores the data corresponding to the address of the DDR memory. After receiving the snooping message, each cache node performs corresponding processing, and then sends a snooping response message to the home node. The cache node 2 is used as an example. If the cache node 2 locally stores the data corresponding to the address of the DDR memory, the snooping response message carries the data corresponding to the address of the DDR memory. If the cache node 2 does not locally store the data corresponding to the address of the DDR memory, the snooping response message does not carry the data corresponding to the address of the DDR memory. After receiving snooping response messages from all other cache nodes, the home node sends a response message to the cache node 1. After the home node obtains the data corresponding to the address of the DDR memory, the response message carries the data corresponding to the address of the DDR memory, and the home node synchronously updates the corresponding data to the DDR memory as required. In this process, if the home node receives a request, from another cache node, for reading data corresponding to the same address, the home node first executes this reading request, and then responds to the reading request from the another cache node.

It should be noted that the DDR memory is a general term for memories such as a DDR 1, a DDR 2, a DDR 3, and a DDR 4.

A data prefetching method provided in the embodiments of this application is applicable to communication between any two or more computing circuits that have a cache capability and support cache coherence. The computing circuit includes but is not limited to a CPU, a graphics processing unit (GPU), a digital signal processor (DSP), a field programmable gate array (FPGA), or the like.

The embodiments of this application may be carried in any cache coherence protocol for extension (for example, the MOESI protocol or the MESIF protocol), not limited to a physical interface form and an interconnection topology structure. In other words, in the method, an existing cache coherence protocol may be directly enhanced; or a new cache coherence mechanism including key elements of this application may be defined, and the embodiments may be carried in any form of physical interface such as a peripheral device interconnect express (PCIe) architecture or Ethernet, and there is no limitation to an interconnection topology structure.

Figure 2A:
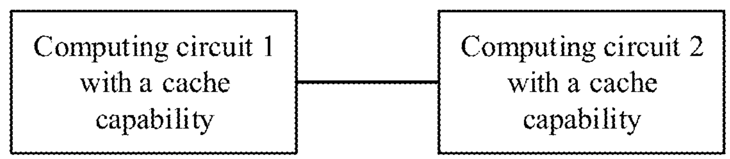
FIG. 2*a* is a schematic structural diagram of a topology to which an application data prefetching method is applied according to an embodiment of this application.
Figure 2B:
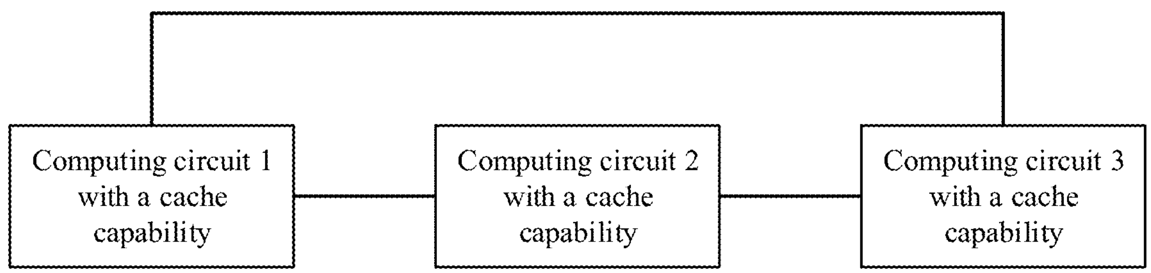
FIG. 2*b* is a schematic structural diagram of another topology to which a data prefetching method is applied according to an embodiment of this application.
Figure 2C:
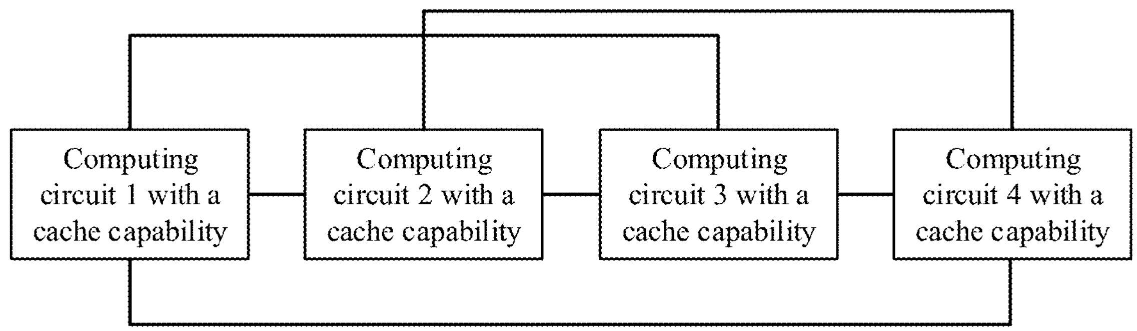
FIG. 2*c* is a schematic structural diagram of another topology to which a data prefetching method is applied according to an embodiment of this application.
Figure 2D:
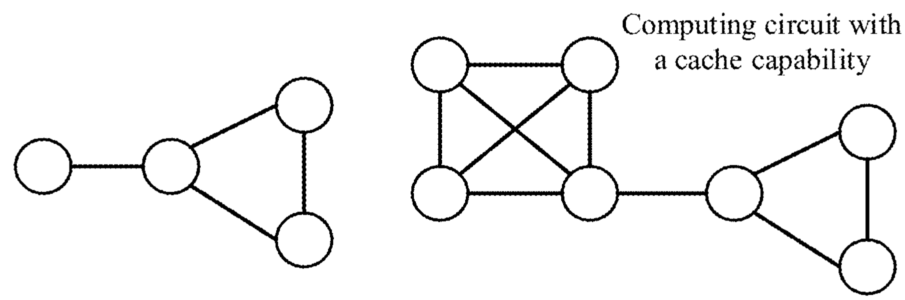
FIG. 2*d* is a schematic structural diagram of another topology to which a data prefetching method is applied according to an embodiment of this application.

FIG. 2*a* shows a direct interconnection structure in which two computing units having a cache capability are directly interconnected. FIG. 2*b* shows a ring/mesh interconnection structure in which three computing units having a cache capability are connected in a head-to-tail manner to form a ring network. FIG. 2*c* shows a fully interconnected structure in which four computing units having a cache capability are interconnected to each other in pairs. FIG. 2*d* shows any interconnection topology in which any computing units having a cache capability are connected to each other randomly.

Figure 3:
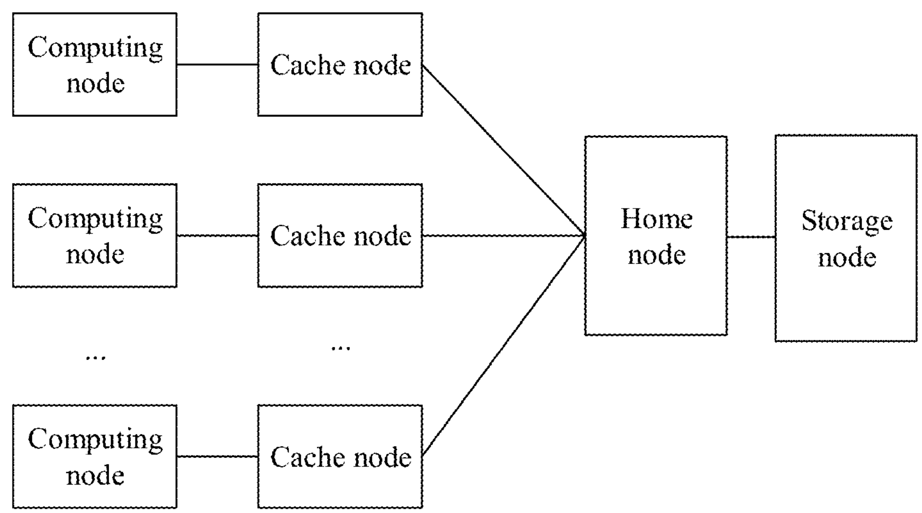
FIG. 3 is a schematic diagram of a framework of a data prefetching system according to an embodiment of this application.

FIG. 3 is a schematic diagram of a framework of a data prefetching system according to an embodiment of this application. As shown in FIG. 3, the data prefetching system includes a plurality of computing nodes, a plurality of cache nodes, a home node, and a storage node.

The computing nodes are connected to the cache nodes, the plurality of computing nodes one-to-one correspond to the plurality of cache nodes, the plurality of cache nodes are connected to the home node, and the home node is connected to the storage node. Data exchange between the plurality of cache nodes is implemented through the home node.

Any cache node C in the cache nodes may receive data from other cache nodes; or receive data sent by a computing node corresponding to the cache node C, then process the data, and send a write request to the home node after the data is processed. In this application, a specific type of node or a specific node from which the cache node C receives data is not limited.

The home node is configured to maintain cache coherence between the plurality of cache nodes. For example, when any one of the plurality of cache nodes obtains data from a computing node corresponding to the cache node or from another cache node, after processing the data to generate new data, the cache node sends the new data to the home node. For another example, when any cache node A in the cache nodes needs to read data, the cache node A sends a data reading request to the home node, and the home node obtains, from the home node or another cache node, the data required by the cache node A. In other words, the home node is a management center of data from a plurality of cache nodes.

It should be noted that the home node may be considered as a next-level cache of the plurality of cache nodes.

Figure 4:
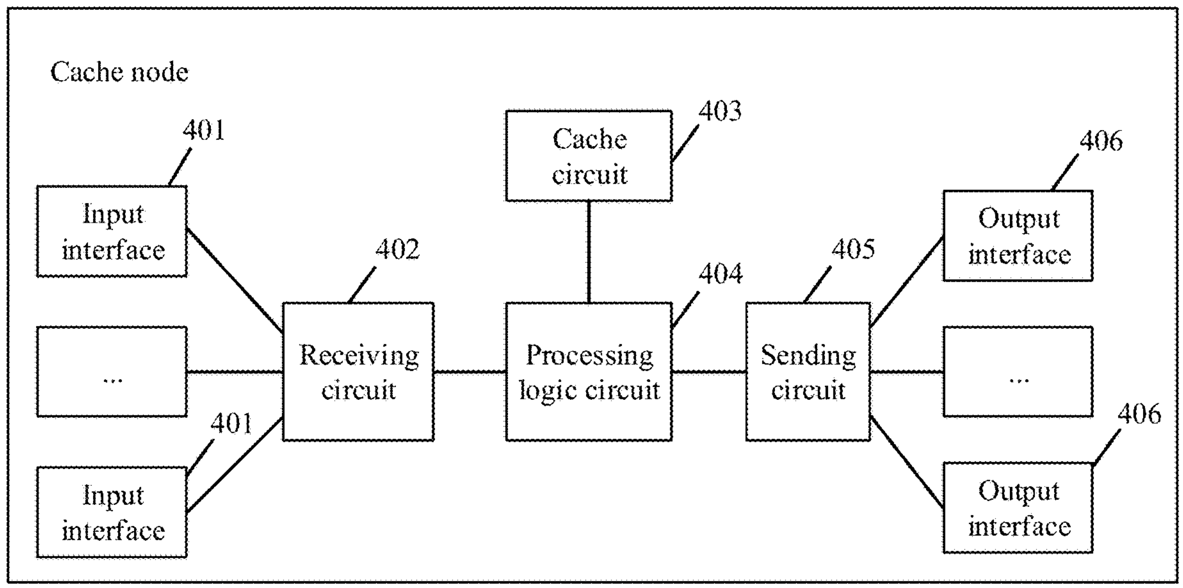
FIG. 4 is a schematic structural diagram of a logic function of a cache node according to an embodiment of this application.

Specifically, as shown in FIG. 4, in terms of division based on logical functions, each of the plurality of cache nodes includes a plurality of input interfaces 401, a plurality of output interfaces 406, a receiving circuit 402, a processing logic circuit 404, a cache circuit 403, and a sending circuit 405.

All of the input interfaces 401 are coupled to the internal receiving circuit 402, and all of the output interfaces 406 are coupled to the internal sending circuit 405, to request the home node to read or write data, or respond to a data reading request of the home node. The input interface 401 and the output interface 406 are configured to implement a connection between cache nodes at adjacent levels, so as to implement different topology structures, as shown in FIG. 2*a* to FIG. 2*d*.

The cache circuit 403 may be configured to store volatile data, an instruction, a data copy in a frequently accessed storage node, and the like. All or a part of the cache circuit 403 may be embedded into the processing logic circuit 404, to access data more quickly. The cache circuit 403 may be a volatile or non-volatile memory.

The processing logic circuit 404 is configured to: process received data, and determine whether data generated by another cache node needs to be prefetched. The processing logic circuit 404 is a core of the cache nodes.

It should be noted that the plurality of cache nodes may form a plurality of levels of caches, for example, a level-2 cache, a level-3 cache, and a level-4 cache.

Figure 5:
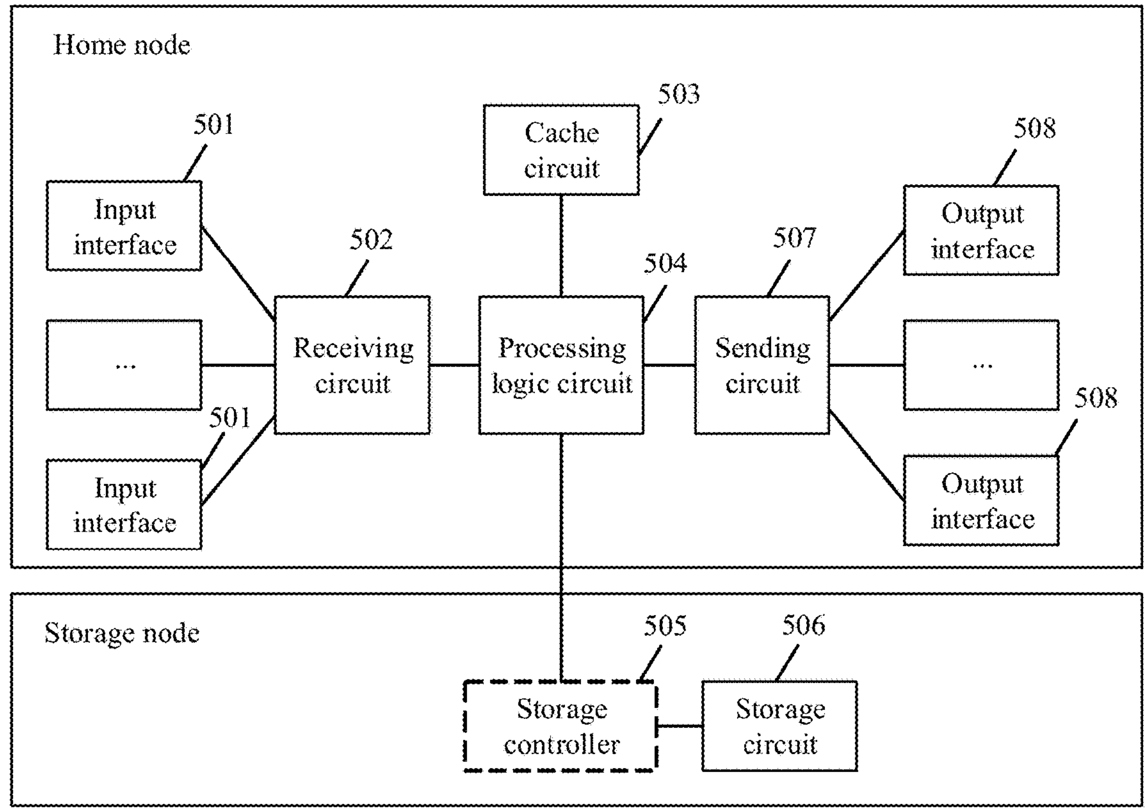
FIG. 5 is a schematic structural diagram of logical functions of a home node and a storage node according to an embodiment of this application.

Specifically, as shown in FIG. 5, in terms of division based on logical functions, the home node includes a plurality of input interfaces 501, a plurality of output interfaces 508, a receiving circuit 502, a processing logic circuit 504, a cache circuit 503, and a sending circuit 507. The storage node includes a storage controller 505 and a storage circuit 506.

All of the input interfaces 501 are coupled to the internal receiving circuit 502, and all of the output interfaces 508 are coupled to the internal sending circuit 507, to request data from an external cache node or respond to a data request of an external cache node.

The cache circuit 503 may be configured to store volatile data, an instruction, a data copy in a frequently accessed storage circuit 506, and the like. The cache circuit 503 may be a volatile or non-volatile memory.

The processing logic circuit 504 is configured to: handle a transaction related to cache coherence and maintain data coherence between cache nodes, and is also a subject for data prefetching.

The storage controller 505 and the storage circuit 506 are configured to store a program instruction and process data that is during program execution. The storage controller 505 is configured to control and manage a data flow that flows into and out of the storage circuit 506. In an embodiment, a function of the storage controller 505 may alternatively be implemented by the processing logic circuit 504, to access the storage circuit 506 more quickly. Therefore, the storage controller 505 in FIG. 5 is expressed by a dashed-line box. Generally, the storage circuit 506 may include a volatile memory and a non-volatile memory. The non-volatile memory may be used for non-volatile storage of data, and the volatile memory may be usually used to store process data during program execution.

First, it should be noted herein that, if the plurality of cache nodes need to share a cache, it is inevitable that the plurality of cache nodes may operate a same cache address. In this case, after a specific cache node operates the cache address, data in storage space corresponding to the cache address is modified; consequently, other cache nodes cannot obtain expected data from the cache address. To ensure coherence, the home node is required to maintain data coherence, so as to ensure that data obtained by other cache nodes is expected data.

Embodiment 1

Figure 6:
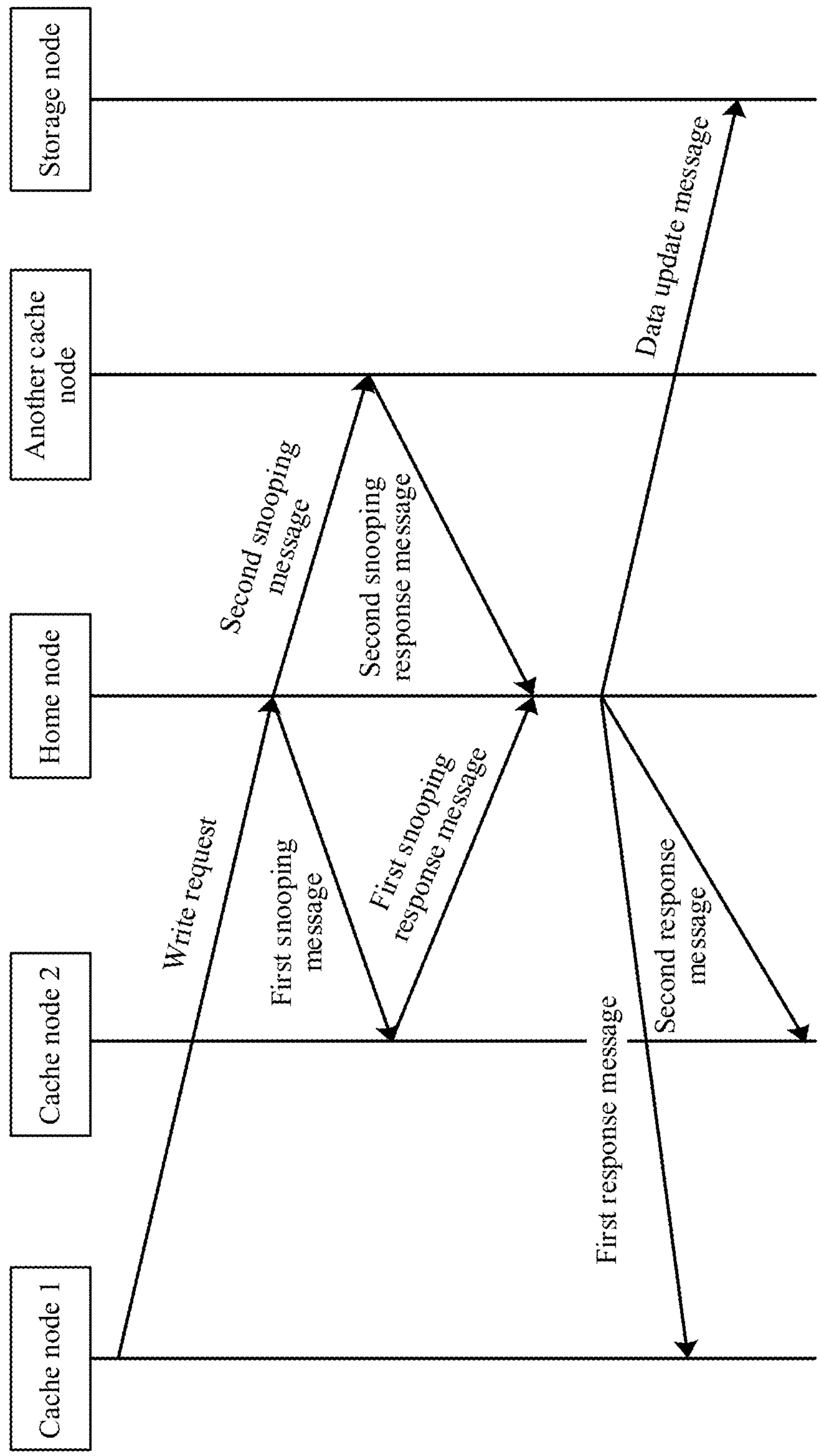
FIG. 6 is a schematic flowchart of a data prefetching method according to an embodiment of this application.

FIG. 6 is a schematic flowchart of a data prefetching method according to an embodiment of this application. The method is applied to a data prefetching system, and the data prefetching system includes a home node and a plurality of cache nodes.

As shown in FIG. 6, the method includes the following operations.

Operation S601: The home node receives a write request that is sent by the cache node 1 after the cache node 1 processes the received data.

It should be noted that, processing performed by the cache node on the received data includes: decapsulating the received data to obtain to-be-written data, mapping the to-be-written data to a payload that meets a transmission protocol between cache nodes, then filling a header of the protocol, and performing rate adaptation, to obtain the write request.

The cache node 1 may receive data from another cache node. Alternatively, the data prefetching system further includes a plurality of computing nodes, and the plurality of computing nodes are respectively connected to a plurality of cache nodes. For example, the cache node 1 may correspond to one computing node. In this case, the cache node 1 may receive data sent by the computing node corresponding to the cache node 1, then process the data, and send a write request to the home node after processing is completed. In this application, a specific type of node or a specific node from which the cache node 1 receives data is not limited.

The write request carries to-be-written data, a data prefetching identifier, and a data prefetching node number. The data prefetching node number is used to indicate a cache node 2. The cache node 1 and the cache node 2 are two different nodes in the plurality of cache nodes.

Operation S602: After obtaining the data prefetching identifier and the data prefetching node number from the write request, the home node sends, based on the data prefetching identifier, a first snooping message to the cache node 2 indicated by the data prefetching node number, where the first snooping message carries a prefetching inquiry identifier.

The prefetching inquiry identifier is used to indicate the cache node 2 to perform an operation of determining whether the cache node 2 needs to perform a data prefetching operation on the to-be-written data.

In one embodiment, the data prefetching system further includes a plurality of computing nodes, and the plurality of computing nodes one-to-one correspond to a plurality of cache nodes. A computing node 1 corresponding to the cache node 1 is configured to perform a first operation on received data, and a computing node 2 corresponding to the cache node 2 is configured to perform a second operation on the received data. There is a high probability that the second operation is performed on the received data after the first operation is performed on the received data. In this application, a specific value of the "high probability" is not limited, and may be defined by a person skilled in the art with reference to an actual product requirement. Specifically, a person skilled in the art may understand that, in this application, if the second operation is performed on the data after the first operation is performed on the data, a prefetching operation of the cache node 2 brings benefits. If the second operation is not performed on the data, processing costs (including longer processing duration and higher processing power consumption) are increased in vain. Therefore, a person skilled in the art may determine a proper "probability" based on an actual application scenario. It may be understood that, when the "probability" is higher, larger benefits are also brought. For example, the high probability may be at least 80% or 90%.

"There is a high probability that the second operation is performed on the received data after the first operation is performed on the received data" may be determined by using a predefined service model. For example, when designing a service model, a product engineer may specify a processing capability of hardware (for example, a computing node). For example, the computing node 1 is designed to have a 90% probability to receive and process voice data and definitely forward processed data to the computing node 2 after processing is completed. In addition, the computing node 1 is designed to have a 10% probability to process other data, but not to forward processed data to the computing node 2. In this case, after the first operation is performed on the data, there is a 90% possibility that the second operation is performed on the data. This is applicable to the solution of this application.

In another embodiment, "There is a high probability that the second operation is performed on the received data after the first operation is performed on the received data" may alternatively be implemented in a processing process, instead of by using a predefined model. That there is a high probability that the second operation is performed on the received data after the first operation is performed on the received data includes: The cache node 1 may determine, based on a type of the received data, that there is a high probability that the second operation is performed on the received data after the first operation is performed on the received data (For example, an operation is performed on the received data, including an integral operation and a decimal operation. If the received data is an integral data type, an integral operation (that is, the second operation) is performed on the data after the data is received (that is, the first operation)). Alternatively, the cache node 1 determines, based on a procedure of processing the received data, that there is a high probability that the second operation is performed on the received data after the first operation is performed on the received data. Alternatively, the cache node 1 determines, based on an actual hardware resource or user service (for example, specific functions, specific hardware, or the like that can be used by a user), that there is a high probability that the second operation is performed on the received data after the first operation is performed on the received data. For example, the user purchases a storage resource when purchasing a cloud resource; in this case, a packet is stored (that is, the second operation) after the packet is received (that is, the first operation). Alternatively, the cache node 1 obtains, based on historical statistical data, a probability that data that has been written to the home node by the cache node 1 is read by the cache node 2, and uses the proportion as a probability that data to be written to the home node currently is read by the cache node 2. When the probability is greater than a specific threshold, in the write request sent to the home node, the cache node 1 sets a prefetching identifier and specifies that a prefetching node number is the cache node 2.

It should be noted that, before the cache node 1 sends the write request to the home node 1, the cache node 1 determines, based on the type of the received data, the known service processing procedure, and/or the hardware resource, a next user (for example, the computing node corresponding to the cache node 2) that has a high probability to use the received data. Therefore, the write request sent by the cache node 1 to the home node carries a data prefetching node number indicating the cache node 2.

For example, the computing node corresponding to the cache node 1 performs the first operation on the received data, and the computing node corresponding to the cache node 2 performs the second operation on the received data. Before sending the write request to the home node, the cache node 1 determines, based on the type of the received data, the known service processing procedure, and/or the hardware resource, that there is a high probability that the second operation is performed on the received data after the first operation is performed on the received data. Therefore, the write request sent by the cache node 1 to the home node carries a data prefetching node number indicating the cache node 2.

It should be noted herein that, after receiving the write request sent by the cache node 1, the home node broadcasts snooping messages to the cache node 2 and another cache node. Because the write request carries the data prefetching node number, and the cache node indicated by the data prefetching node number is the cache node 2, a prefetching inquiry identifier is carried in the snooping message sent to the cache node 2. The prefetching inquiry identifier is used to indicate the cache node 2 to perform the operation of determining whether a data prefetching operation needs to be performed on the to-be-written data. For differentiation, a snooping message sent to the another cache node is referred to as a second snooping message, and a snooping message sent to the cache node 2 is referred to as a first snooping message.

The another cache node is a cache node in the plurality of cache nodes except the cache node 1 and the cache node 2.

The second snooping message sent by the home node to the another cache node is used to indicate the another cache node to delete raw data stored in a cache circuit of the another cache node, where the raw data is data corresponding to a data write address that is before the home node receives the to-be-written data.

An advantage of such processing is that, for example, before the cache node 1 sends the write request to the home node, some cache nodes have obtained data corresponding to the data write address, for use by computing nodes corresponding to the cache nodes. After the home node receives the write request sent by the cache node 1, data corresponding to the data write address changes. For the cache nodes that has obtained data corresponding to the data write address, because the data obtained by the cache nodes is not expected, the home node sends a second snooping message to the cache nodes, to indicate the cache nodes to delete the data corresponding to the data write address. After the home node processes the to-be-written data in the write request sent by the cache node 1, another cache node may send a data reading request to the home node, to request to obtain latest data (that is, to-be-written data) corresponding to the data write address. In this way, these cache nodes can obtain same data for a same storage address.

In one embodiment, after the cache node 2 receives the first snooping message, the cache node 2 first determines whether the cache node 2 has a data prefetching function. If determining that the cache node 2 has a data prefetching function, the cache node 2 continues to determine whether the cache node 2 requires to-be-written data. If determining that the cache node 2 requires the to-be-written data, the cache node 2 determines that the cache node 2 needs to perform a data prefetching operation on the to-be-written data. If determining that the cache node 2 has a data prefetching function but does not require to-be-written data, the cache node 2 determines that the cache node 2 does not need to perform a data prefetching operation on the to-be-written data. If determining that the cache node 2 does not have a data prefetching function, the cache node 2 determines that the cache node 2 does not need to perform a data prefetching operation on the to-be-written data.

Operation S603: The home node receives a first snooping response message sent by the cache node 2, where the first snooping response message includes indication information used to indicate whether the cache node 2 needs to perform the data prefetching operation on the to-be-written data.

The first snooping response message has two functions: One is to respond to the first snooping message, and the other is to indicate whether the cache node 2 needs to perform a data prefetching operation on the to-be-written data. If the first snooping response message indicates that the cache node 2 needs to perform a data prefetching operation on the to-be-written data, the second function of the first snooping response message may be considered as that the cache node 2 requests to obtain the to-be-written data from the home node.

Compared with a conventional snooping response message, the snooping response message in this application has a function of indicating whether the cache node 2 performs a data prefetching operation on the to-be-written data.

It should be noted that, when the indication information is used to indicate that the cache node 2 needs to perform the data prefetching operation on the to-be-written data, the first snooping response message is specifically used to respond to the first snooping message and request to obtain the to-be-written data. When the indication information is used to indicate that the cache node 2 does not need to perform a data prefetching operation on the to-be-written data, the first snooping response message is specifically used to respond to the first snooping message.

In one embodiment, the indication information is a first prefetching result identifier included in the first snooping response message, and different values of the first prefetching result identifier are used to indicate whether the cache node 2 needs to perform the data prefetching operation on the to-be-written data. For example, when a value of the first prefetching result identifier is a first preset threshold (for example, true or 1), it indicates that the cache node 2 needs to perform the data prefetching operation on the to-be-written data; when a value of the first prefetching result identifier is a second preset threshold (for example, false or 0), it indicates that the cache node does not need to perform the data prefetching operation on the to-be-written data.

In one embodiment, the indication information is information indicating, depending on whether the first snooping response message includes a second prefetching result identifier, whether the cache node 2 needs to perform a data prefetching operation on the to-be-written data. For example, when the first snooping response message includes a second prefetching result identifier, it indicates that the cache node 2 needs to perform a data prefetching operation on the to-be-written data; when the first snooping response message does not include a second prefetching result identifier, it indicates that the cache node 2 does not need to perform a data prefetching operation on the to-be-written data. It should be noted that values of the second prefetching result identifier may be the same or different.

It should be noted that some or all of the data prefetching identifier, the prefetching inquiry identifier, the first prefetching result identifier, and the second prefetching result identifier may be a same field in different messages. In other words, the same field in the different messages is used to indicate different meanings.

In an embodiment, if it is determined that the cache node 2 does not need to perform a data prefetching operation on the to-be-written data, the home node stores the to-be-written data and the data write address into a cache circuit of the home node.

It should be noted that the cache circuit of the home node stores a table of correspondences between data and a storage address, and the data storage address is an address in the storage node. Specifically, the home node traverses the table of the correspondence between data and a storage address; and updates the data corresponding to the data write address to the to-be-written data if determining that the table of the correspondence between data and a storage address stores the data write address of the to-be-written data; or if determining that the table of the correspondence between data and a storage address does not store the data write address of the to-be-written data, stores the to-be-written data and the data write address to the table of the correspondence between data and a storage address.

Operation S604: When determining, based on the indication information, that the cache node 2 needs to perform a data prefetching operation on the to-be-written data, the home node sends, to the cache node 2, a response message carrying the to-be-written data.

The response message carries the to-be-written data. If the first snooping response message is used to indicate that the cache node 2 needs to perform a data prefetching operation on the to-be-written data, the first snooping response message may be considered as that the cache node 2 requests to obtain the to-be-written data from the home node. In addition, the response message herein is also used to respond to the first snooping message, that is, has the function of responding to the first snooping message mentioned in operation 603.

It should be noted that the home node stores the table of the correspondence between data and a storage address. The correspondence table includes data and corresponding storage addresses, and the storage addresses are addresses in the storage node.

In one embodiment, the data prefetching system further includes a storage node, the write request further includes a data write address, and the data write address is a storage address of to-be-written data in the storage node. The method further includes:

if determining, based on the indication information, that the cache node 2 does not need to perform a data prefetching operation on the to-be-written data, storing, by the home node, the to-be-written data and the data write address to the cache circuit of the home node; if the cache circuit of the home node does not have sufficient space to store the to-be-written data and/or the data write address, sending, by the home node, a data update message to the storage node, to update the to-be-written data to storage space in the storage node that corresponds to the data write address, where the data update message carries the to-be-written data and the data write address; and if data is already stored in the storage space in the storage node that corresponds to the data write address, deleting the data and storing the to-be-written data to the storage space corresponding to the data write address; or if no data is stored in the storage space corresponding to the data write address, directly storing the to-be-written data to the storage space corresponding to the data write address.

It should be noted that, when another cache node needs to repeatedly read the to-be-written data within a period of time, that is, the to-be-written data is hot data, to facilitate obtaining the to-be-written data by the another cache node, the home node temporarily stores the to-be-written data to the table of the correspondence between data and a storage address, so that the home node can directly obtain the to-be-written data from the correspondence table. When the another cache node does not need to repeatedly read the to-be-written data within a period of time, the to-be-written data is cold data. To save storage space of the home node, the home node writes the to-be-written data to the storage space in the storage node that corresponds to the data write address.

In one embodiment, when the plurality of cache nodes send, to the home node, a request for reading data stored in storage space that is in the storage node and that corresponds to a same address A, the home node first traverses a table, stored in the home node, of a correspondence between data and a data storage address; determines whether the home node caches data corresponding to the address A; and if the home node stores the data corresponding to the address A, sends the data to a plurality of cache nodes at the same time; or if the home node does not cache the data corresponding to the address A, the home node obtains, from the storage node, the data corresponding to the address A, and sends the data to the plurality of cache nodes simultaneously.

It should be noted that the cache circuit of the home node stores the table of the correspondence between data and a storage address. The data storage address is an address in the storage node. The home node maintains data coherence between the plurality of cache nodes based on the correspondence table.

In one embodiment, when sending the response message to the cache node 2, the home node sends a completion message to the cache node 1, where the completion message is used to respond to the write request. In other words, the completion message is used to inform the cache node 1 that the home node has written the to-be-written data.

It should be noted that a person skilled in the art may understand that, due to hardware limitation, it is usually impossible to implement 100% simultaneity. Therefore, "simultaneously" in this application does not mean that there is no time difference, but that there is a comparatively small time difference, to ensure that two messages are sent simultaneously as much as possible. In this way, the messages can be transferred to a peer end as soon as possible, to reduce a delay. Specifically, the time difference may be one or more instruction cycles. In addition, a sequence of sending the two messages is not limited either. For example, the home node sends the response message before sending the completion message. Alternatively, the home node sends the completion message before sending the response message.

Figures 7A, 7B:
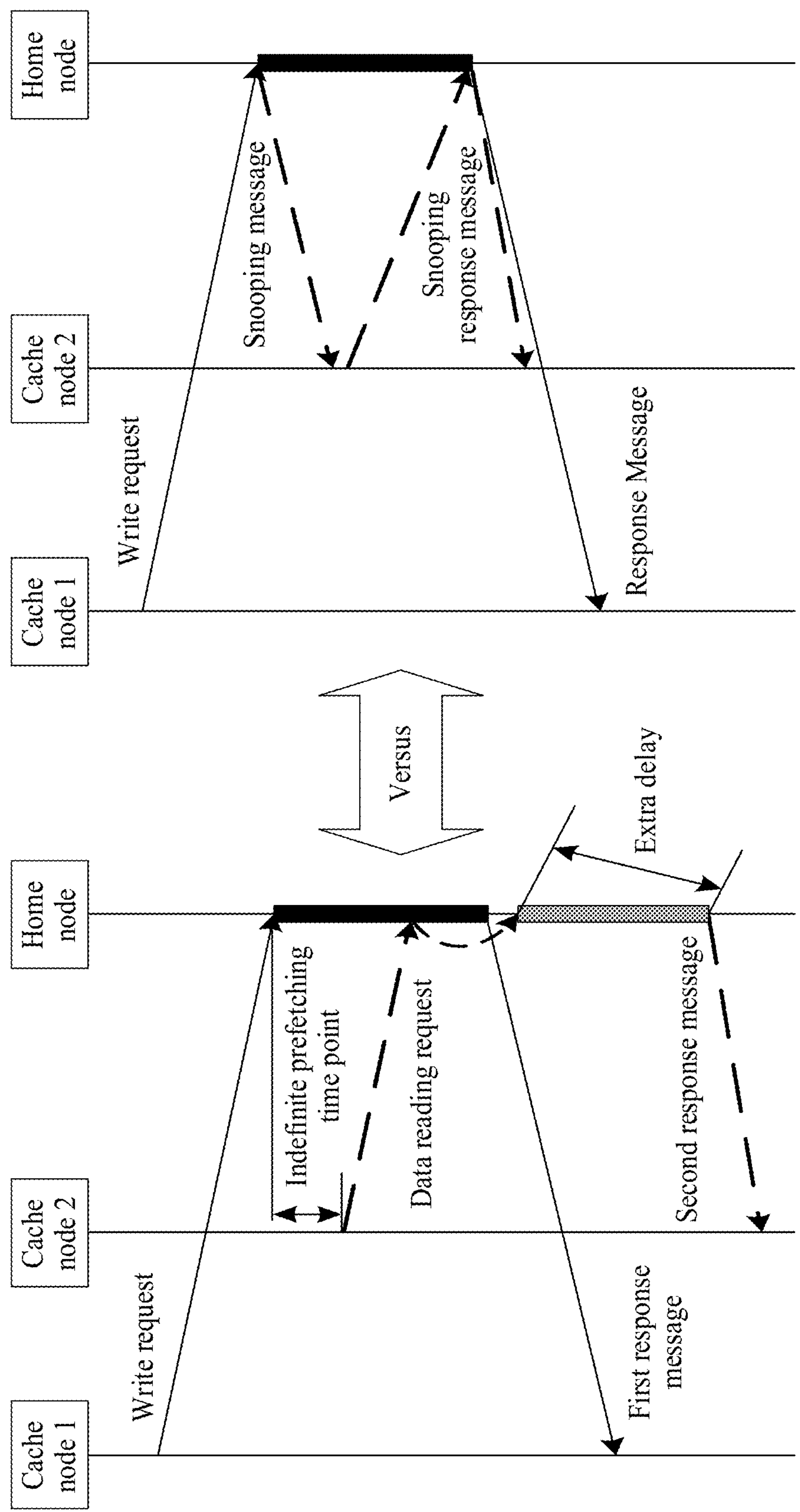
FIG. 7*a* is a schematic diagram of data prefetching in the prior art.
FIG. 7*b* is a schematic diagram of data prefetching performed after an embodiment of the data prefetching method in this application is used.

For beneficial effects of the data prefetching method in this application, refer to FIGS. **7*a*-7*b*. FIG. 7*a* is a schematic diagram of data prefetching in the prior art. It can be learned from the figure that disadvantages of the prior art include: an indefinite time point at which data prefetching is performed, indefiniteness of a result about whether data needs to be prefetched, and a large delay. FIG. 7*b* is a schematic diagram of data prefetching performed after the data prefetching method in this application is used. It can be learned from the figure that a data prefetching time point is determined. As shown in FIG. 7*b*, in the solution of this application, after receiving the write request sent by the cache node 1, the home node sends a snooping message to the cache node 2. A prefetching inquiry identifier in the snooping message is used to indicate the cache node 2 to perform an operation of determining whether a data prefetching operation needs to be performed on the to-be-written data in the write request. After replying, to the home node, whether the cache node 2 needs to perform the data prefetching operation on the to-be-written data, the cache node 2 sends a snooping response message to the home node. The snooping response message carries the indication information used to indicate whether the cache node 2 needs to perform the data prefetching operation on the to-be-written data. If determining, based on the indication information, that the cache node 2 needs to perform the data prefetching operation on the to-be-written data, the home node sends a response message to the cache node 2**. The response message carries the to-be-written data. According to the embodiments of this application, an application scenario of data prefetching is extended to be not limited to a same cache node, and a data prefetching time point is definite and is the earliest. In addition, data prefetching accuracy is improved, and a data interaction delay is further reduced. When a plurality of cache nodes access a same address, a processing delay may be compressed into a single instruction cycle.

In one embodiment, the data prefetching system is a processor, the plurality of computing nodes are cores in the processor, the cache node and the home node each include a cache and a cache control circuit that are in the processor, and the storage node may be a DDR storage medium. The home node exchanges data with the cache node through a cache bus. In terms of a protocol, the home node exchanges data with the cache node based on a cache coherence protocol (such as the MSI protocol or the MSIF protocol).

Embodiment 2

Figure 8:
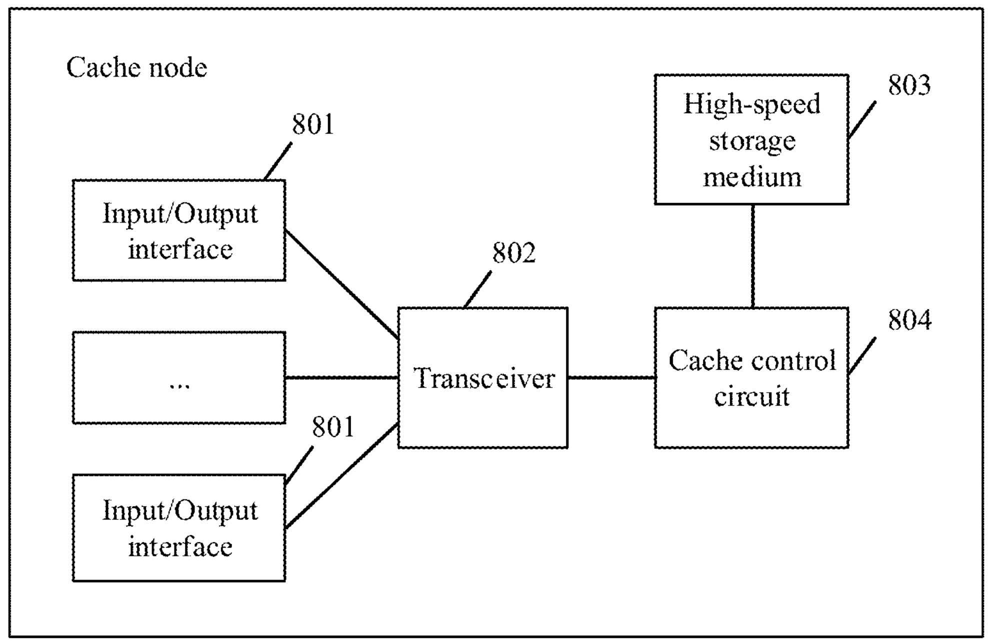
FIG. 8 is a schematic structural diagram of a cache node based on a processor scenario according to an embodiment of this application.

Based on the foregoing embodiment, this embodiment specifically describes the foregoing solution based on a processor scenario. In the scenario of the processor, a cache node (including a cache and a cache control circuit) may be considered as a cache circuit. As shown in FIG. 8, the cache circuit includes a plurality of input/output interfaces 801, a transceiver 802, a cache control circuit 804, and a high-speed storage medium 803. The input/output interfaces 801 are directly coupled to the transceiver 802. The transceiver 802 is connected to the cache control circuit 804. The plurality of input/output interfaces 801 are equivalent to the input interfaces 401 and the output interfaces 406 in FIG. 4. The transceiver 802 is equivalent to the sending circuit 405 and the receiving circuit 402 in FIG. 4. The cache control circuit 804 is equivalent to the processing logic circuit 404 in FIG. 4. The cache control circuit 804 is connected to the high-speed storage medium 803. The high-speed storage medium 803 is equivalent to the cache circuit 403 in FIG. 4. The high-speed storage medium 803 may be a static random-access memory (SRAM).

In one embodiment, each of the plurality of cache nodes includes one high-speed storage medium, or the plurality of cache nodes share one high-speed storage medium. The high-speed storage medium is logically divided into a plurality of cache circuits, so that one cache circuit of each of the plurality of cache nodes is for use.

Figure 9:
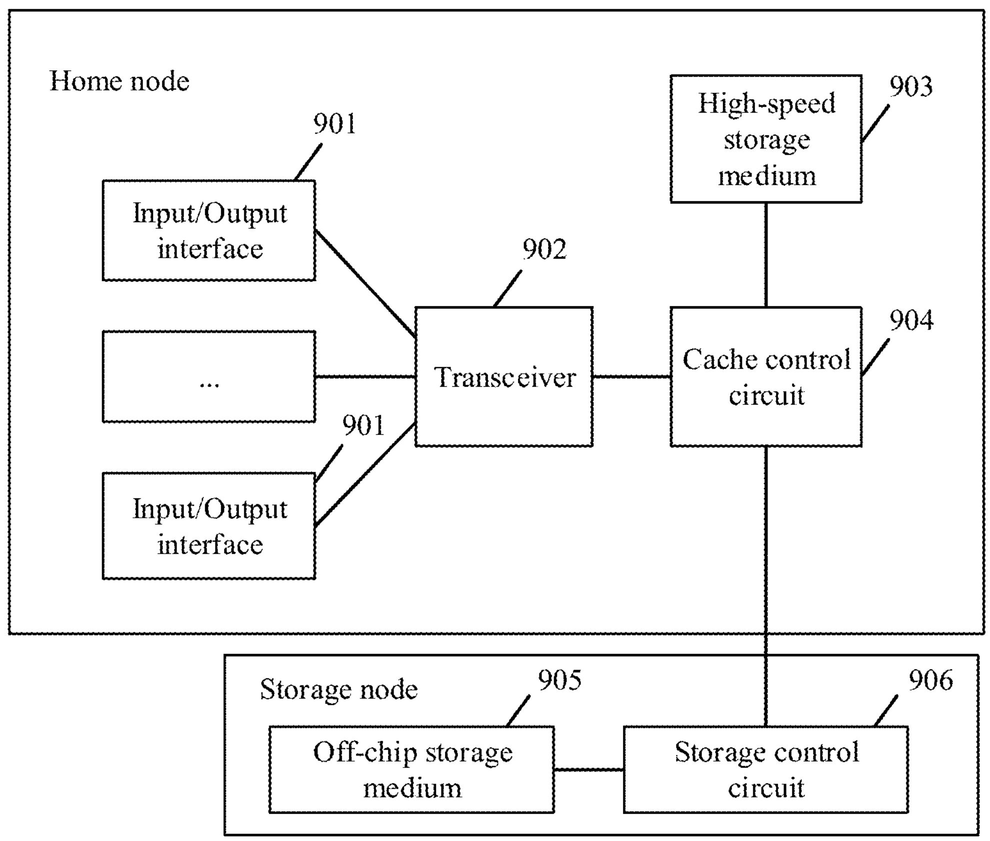
FIG. 9 is a schematic structural diagram of a home node and a cache node based on a processor scenario according to an embodiment of this application.

In the scenario of the processor, a home node (including a cache and a cache control circuit) may also be considered as a cache circuit. As shown in FIG. 9, the cache circuit includes a plurality of input/output interfaces 901, a transceiver 902, a cache control circuit 904, and a high-speed storage medium 903. The input/output interface 901 is directly coupled to the transceiver 902, and the transceiver 902 is connected to the cache control circuit 904. The plurality of input/output interfaces 901 are equivalent to the input interfaces 501 and the output interfaces 506 in FIG. 5, and the transceiver 902 is equivalent to the sending circuit 507 and the receiving circuit 502 in FIG. 5. The cache control circuit 904 is equivalent to the processing logic circuit 504 in FIG. 5. The cache control circuit 904 is connected to the high-speed storage medium 903. The high-speed storage medium 903 is equivalent to the cache circuit 503 in FIG. 5. The high-speed storage medium 903 may be a SRAM.

The storage node includes a storage control circuit 906 and an off-chip storage medium 905. The storage control circuit 906 is equivalent to the storage controller 505 in FIG. 5. The off-chip storage medium 905 is equivalent to the storage circuit 506 in FIG. 5. The off-chip storage medium 905 is an external storage medium of the processor, and may be a synchronous dynamic random access memory (SDRAM), for example, may be specifically a DDR SDRAM (also referred to as a "DDR" or "DDR memory" in this application). It should be noted that a memory access speed of the SRAM is fastest, and a memory access speed of the SDRAM is slower than the memory access speed of the SRAM.

In a possible example, the storage control circuit 906 of the storage node may be embedded into the cache control circuit 904 of the home node.

In one embodiment, each of the storage nodes includes one off-chip storage medium, or the plurality of storage nodes share one off-chip storage medium. The off-chip storage medium is logically divided into a plurality of virtual storage circuits (for example, different storage areas in the off-chip storage medium), so that one virtual storage circuit of each of the plurality of storage nodes is for use.

For the scenario of the processor, in a specific embodiment, one or more virtual machines (referred to as "virtual machine groups" in this application) run on the processor. In addition, these virtual machines are also referred to as "task machines" because the virtual machines are configured to execute tasks. The virtual machines can share a physical memory, and from a perspective of hardware, may be processor-based single-chip systems. However, a memory in the single-chip system is shared. Each virtual machine group includes a respective private memory, and there is a memory shared between the virtual machine groups.

In an application scenario, the processor may perform a video decoding operation. After the processor receives a bitstream from a cloud, a virtual machine group 1 running on the processor is configured to receive a packet, a virtual machine group 2 is configured to decompress the packet, a virtual machine group 3 is configured to decode the packet, and a virtual machine group 4 is configured to perform back-end storage. Therefore, a service process of video decoding on the processor is: packet receiving, decompressing, decoding, and storing.

For example, a core corresponding to the cache node 1 is used to run the virtual machine group 1, and a core corresponding to the cache node 2 is used to run the virtual machine group 2. Therefore, the cache node 1 may determine, based on the service process, that the virtual machine group 1 needs to transmit the packet to the virtual machine group 2 after receiving the packet (that is, the cache node 1 determines that a next user of data processed by the cache node 1 is the cache node 2 or there is a high possibility that data processed by the cache node 1 is used by the cache node 2), to decompress the packet.

For another example, a core corresponding to the cache node 1 is used to run the virtual machine group 1, and a core corresponding to the cache node 2 is used to run the virtual machine group 4. After receiving a packet over a network, if the virtual machine group 1 needs to store the received packet, and knows a capability of the virtual machine group 4 (for example, having only a storage capability), it indicates that there is a high probability that the packet is sent to the virtual machine group 4 used for storage.

Embodiment 3

Based on the foregoing embodiments, this embodiment discloses another data prefetching system. In this embodiment, the data prefetching system is a cluster computing system. In addition, when the cluster computing system includes a plurality of processing servers and a storage server, a cache node of the data prefetching system includes a memory controller and a memory that are in a processing server, for example, a DDR storage medium and a DDR controller that are in a processing server. The home node includes a processor and a memory that are in a storage server. The storage node is a circuit including a storage controller and a storage medium that are in the storage server, for example, a circuit including a solid-state disk (SSD) controller and an SSD storage medium. The home node exchanges data with a computing node by using an infiniband (TB) bus.

Figure 10:
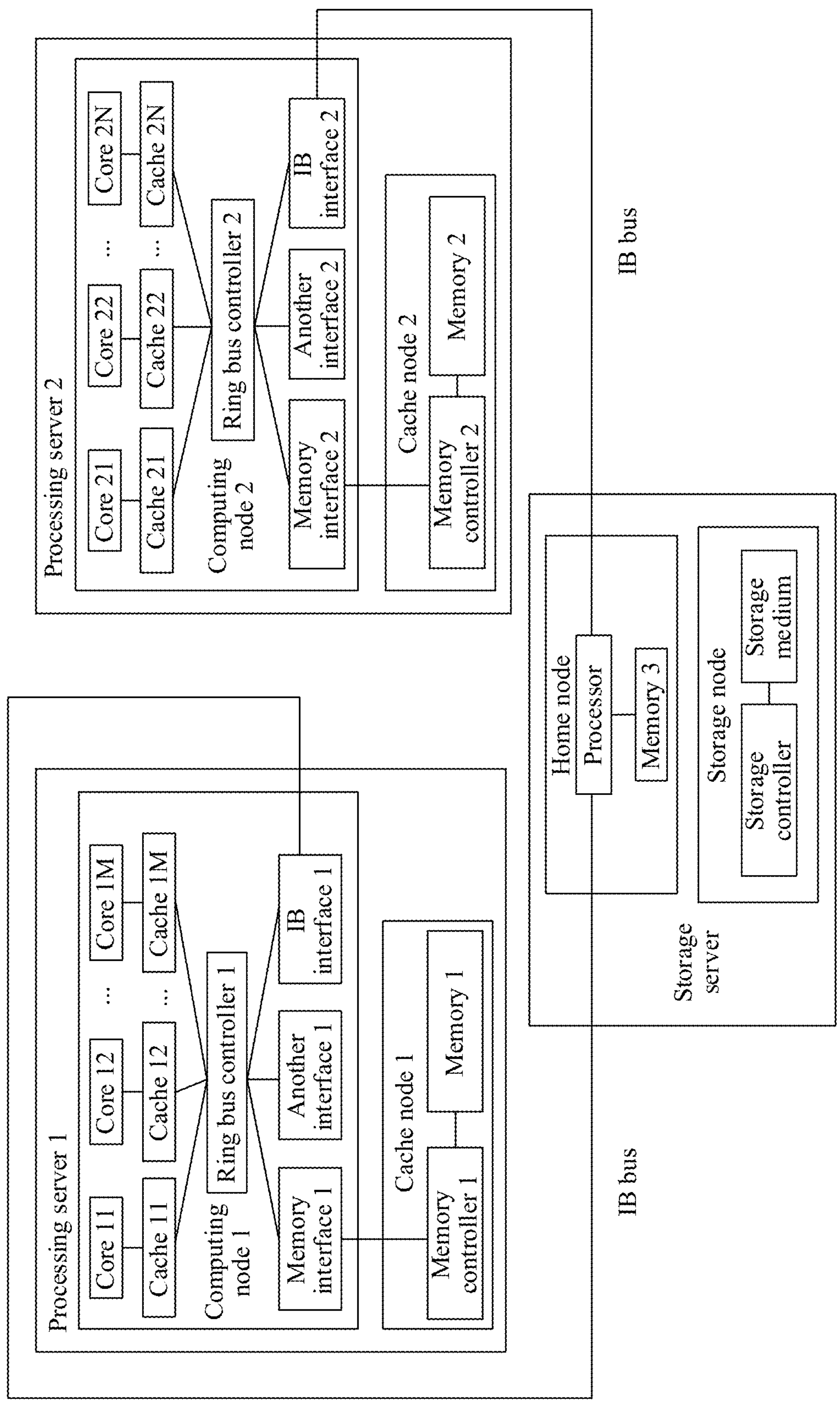
FIG. 10 is a schematic structural diagram of a home node and a cache node based on a cluster computing scenario according to an embodiment of this application.

As shown in FIG. 10, the cluster computing system includes a processing server 1, a processing server 2, and a storage server. The processing server 1 includes a computing node 1 and a cache node 1. The computing node 1 includes M cores, M caches, a ring bus controller 1, a memory interface 1, an IB interface 1, and another interface 1, where M is an integer greater than or equal to 1. Each of the M caches includes a cache medium and a control circuit for the cache medium, for example, a cache medium and a cache control circuit. The M cores are connected to the M caches respectively, the M caches are further connected to the ring bus controller 1, and all of the memory interface 1, the IB interface 1, and the another interface 1 are connected to the ring bus controller 1. The cache node 1 includes a memory controller 1 and a memory 1. The cache node 1 exchanges data with the computing node 1 by using the memory controller 1 of the cache node 1 and the memory interface 1 of the computing node 1.

In one embodiment, the core in the processing server 1 may be an ARM core or an x86 core.

It should be noted that the processing server 2 has same functional entities or same logical circuits as the processing server 1. A connection relationship between these functional entities or logical circuits of the processing server 2 is the same as a connection relationship between functional entities or logical circuits in the processing server 1. Details are not described herein again. In other words, the processing server 2 includes a computing node 2 and a cache node 2. The processing server 2 includes N cores and N caches, and the N cores are connected to the N caches respectively. The N caches are circuits including a cache medium and a controller therefor. N is an integer greater than or equal to 1, and N is the same as or different from M.

In one embodiment, the core in the processing server 2 may be an ARM core or an x86 core.

The storage server may include a home node and a storage node. The home node includes a processor and a memory (a memory 3 shown in FIG. 10). The storage node includes a storage controller and a storage medium. For the storage controller and the storage medium, if the storage medium is a hard-disk drive storage medium, the storage controller is a hard-disk drive storage medium controller. If the storage medium is an SSD storage medium, the storage controller is an SSD controller; or if the storage medium is a flash, the storage controller is a flash controller.

The processor of the home node is connected to the IB interface 1 of the computing node 1 by using the IB bus. Because the IB interface 1 is connected to the memory controller 1 of the cache node 1 by using the ring bus controller 1 and the memory interface 1, data exchange between the home node and the cache node 1 can be implemented. The home node is further connected to the IB interface 2 of the computing node 2 of the processing server 2 by using the IB bus. Because both the IB interface 2 and the memory interface 2 are connected to the ring bus controller 2, and the memory interface 2 is connected to the memory controller 2 of the cache node 2, data exchange between the home node and the cache node 2 can be implemented.

Specifically, after the memory controller 1 of the cache node 1 receives data transmitted by the computing node 1 through the memory interface 1, the memory controller 1 processes the data. After processing the data, the memory controller 1 sends a write request to the home node through the memory interface 1, the ring bus controller 1, and the IB interface based on the IB bus. The write request carries to-be-written data, a data prefetching identifier, a data prefetching node number, and a data write address. The to-be-written data is processed data, a cache node indicated by the data prefetching node number is the cache node 2, and the data write address is a storage address of the to-be-written data in a storage medium of the storage node.

After receiving the write request from the cache node 1, the home node obtains the to-be-written data, the data prefetching node number, the data prefetching identifier, and the data write address from the write request, and sends a first snooping message to the cache node 2 indicated by the data prefetching node number. The first snooping message carries a prefetching inquiry identifier. Specifically, the processor of the home node sends the first snooping message to the ring bus controller 2 of the processing server 2 through the IB interface 2 of the processing server 2 by using the IB bus, and the ring bus controller 2 sends the first snooping message to the memory controller 2 of the cache node 2 through the memory interface 2.

After receiving a first snooping response message sent by the memory controller 2 of the cache node 2, the processor of the home node determines, based on the first snooping response message, whether the cache node 2 needs to perform a data prefetching operation on the to-be-written data. If determining that the cache node 2 needs to perform a data prefetching operation on the to-be-written data, the home node sends a response message to the cache node 2. The response message carries the to-be-written data. A path along which the home node sends the response message to the cache node 2 is the same as a path along which the home node sends the first snooping message to the cache node 2. If determining that the cache node 2 does not need to perform a data prefetching operation on the to-be-written data, the processor of the home node saves the to-be-written data and a data write address into the memory 3. If the memory 3 of the home node does not have sufficient storage space to store the to-be-written data and/or the data write address, the to-be-written data is saved or updated to storage space, corresponding to the data write address, in the storage medium of the storage node.

In addition, the processor of the home node sends, based on the IB bus, a completion message to the memory controller 1 of the cache node 1 through the IB interface 1, the ring bus controller 1, and the memory interface 1. The completion message is used to inform the cache node 1 that data writing is completed.

It should be noted that both the memory 1 of the cache node 1 and the memory 2 of the cache node 2 may be a DDR storage medium. If the memory 1 of the cache node 1 and the memory 2 of the cache node 2 are DDR storage media, the memory controller 1 and the memory controller 2 are DDR controllers, and the memory interface 1 and the memory interface 2 are DDR interfaces.

It should be noted that the home node is a management node for data or a database shared by all cache nodes (including the cache node 1 of the processing server 1 and the cache node 2 of the processing server 2). The database includes the shared data.

In one embodiment, the another interface 1 of the processing server 1 includes a PCIE interface or an Ethernet interface, and another interface 2 of the processing server 2 includes a PCIE interface or an Ethernet interface. The cache node 1 of the processing server 1 exchanges data with the home node through the PCIE interface or the Ethernet interface (that is, the IB interface may not be used), and the cache node 2 of the processing server 2 exchanges data with the home node through the PCIE interface or the Ethernet interface (that is, the IB interface may not be used). In this way, the data or database shared by the cache node 1 of the server 1 and the cache node 2 of the processing server 2 is managed. The database includes the shared data.

It can be learned that, in the solution of this embodiment of this application, after receiving the write request from the cache node 1, the home node sends the first snooping message to the cache node 2. When determining that the cache node 2 needs to perform the data prefetching operation on the to-be-written data in the write request, the home node sends the to-be-written data to the cache node 2. According to this embodiment of this application, a data prefetching scenario is not limited to one cache node, a problem of indefiniteness of a prediction result and a time point at which data prefetching is initiated is resolved, and a delay is reduced.

Embodiment 4

Figure 11:
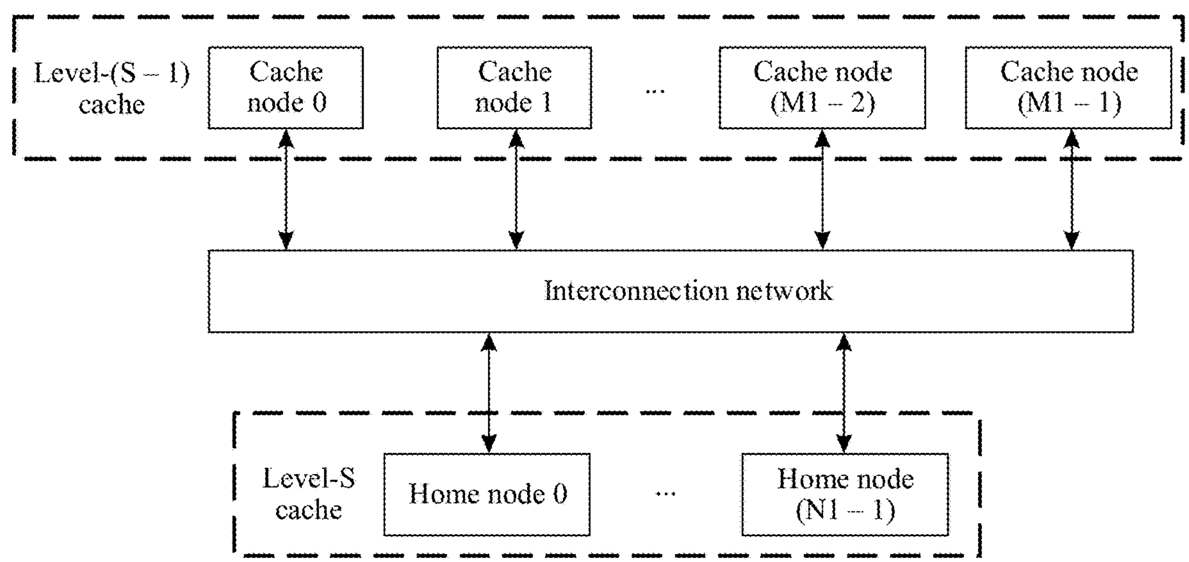
FIG. 11 is a schematic diagram of a multi-core system with a single-level structure.

Based on the foregoing embodiments, this application describes another data prefetching system and another data prefetching method. FIG. 11 is a schematic diagram of a data prefetching system with a single-level structure. As shown in FIG. 11, the data prefetching system includes two levels of caches: a level-(S−1) cache and a level-S cache. The level-(S−1) cache includes M1 cache nodes, and the level-S cache includes an interconnection network and N1 home nodes, where M1, N1, and S are all integers greater than or equal to 1. The home node may be logically and physically understood as a next-level cache node of a cache node. When there are a plurality of home nodes, all memories to which the home nodes belong are addressed, that is, the plurality of home nodes may be logically understood as distributed home nodes, and each home node manages cache coherence between cache nodes. The interconnection network is used to provide interconnection for communication between the M1 cache nodes and the N1 home nodes. It should be noted that the single-level cache herein means that there is only one level of cache node in FIG. 11, that is, the level-(S−1) cache.

It should be noted that a lower-level cache may be a home node of an upper-level cache. For example, in a multi-core CPU chip, if a cache node is a level-1 cache/level-2 cache, the home node is a level-3 cache; if a cache node is a level-3 cache, the home node is a level-4 cache, and so on. The cache node is a cache in the multi-core CPU chip, and the home node is a management node of a cache bus in the multi-core CPU chip. The plurality of cores described herein may be in one CPU, or cross CPUs, or cross CPUs and accelerators.

Figure 12:
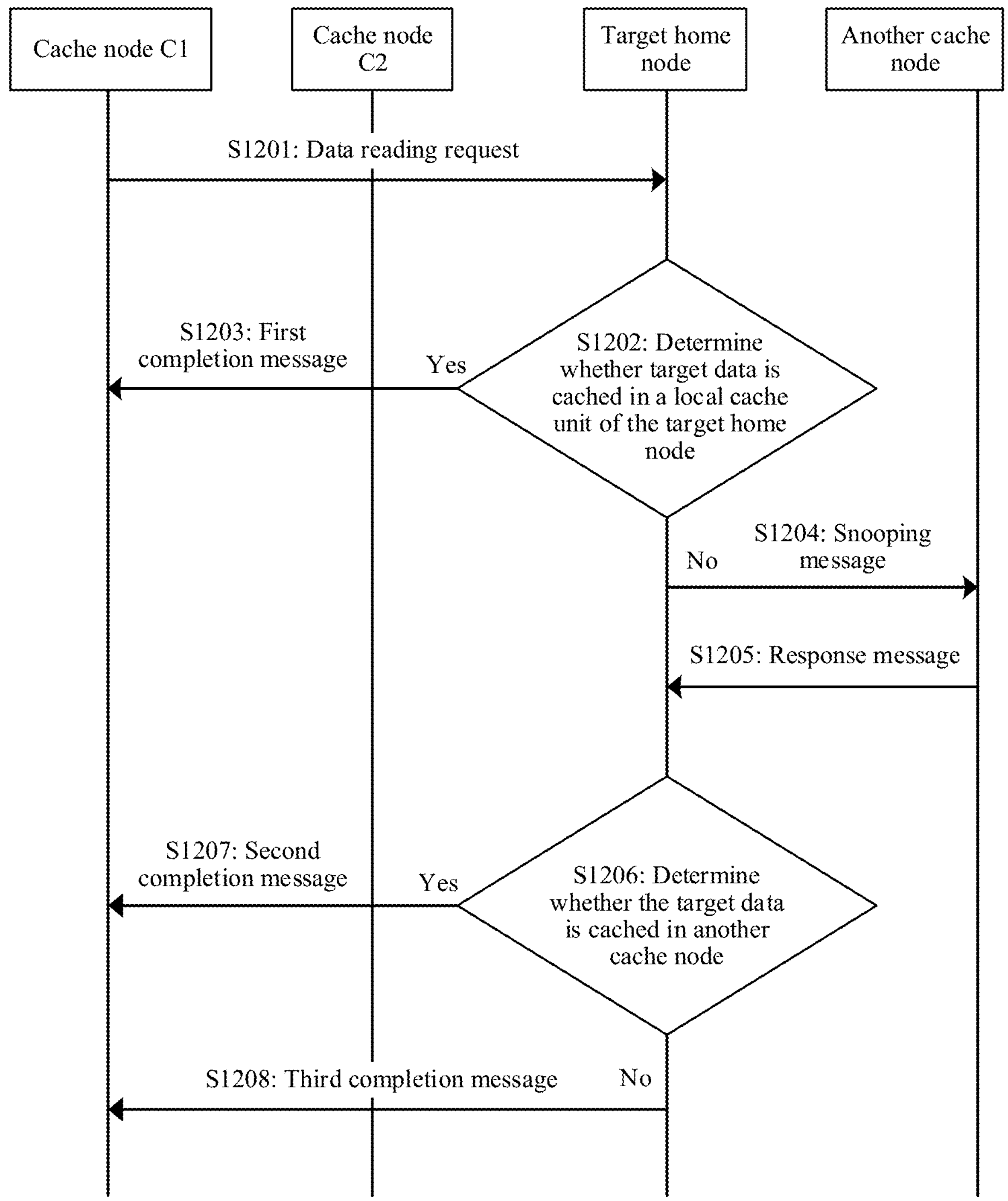
FIG. 12 is a schematic flowchart of a data prefetching method according to an embodiment of this application.

FIG. 12 is a schematic flowchart of a data reading method according to an embodiment of this application. As shown in FIG. 12, the method includes the following operations.

Operation S1201: A cache node C1 sends a data reading request to a target home node, where the data reading request is used to request to read target data.

The cache node C1 is one of M1 cache nodes included in a level-(S−1) cache, and the target home node is one of N1 home nodes included in a level-S level cache. The data reading request carries a data reading address. The data reading address is an address in a storage node, and latest data stored in storage space corresponding to the address is the target data.

It should be noted that there is a connection relationship between the M1 cache nodes and the N1 home nodes. Therefore, when a cache node needs to read data, the cache node may directly send a data reading request to a home node that has a connection relationship with the cache node.

Operation S1202: The target home node determines whether the target data is cached in a local cache circuit of the target home node.

When determining that the target data is cached in the local cache circuit of the target home node, the target home node performs operation S1203. When determining that the target data is not cached in the local cache circuit of the target home node, the target home node performs operation S1204.

Specifically, the local cache circuit of the target home node stores a table of a correspondence between data and a storage address. The target home node first traverses the table of the correspondence between data and a storage address based on the data reading address, and determines whether the target data is stored in the correspondence table; and if the target data is stored in the correspondence table, determines that the local cache circuit of the target home node caches the target data, and the target home node performs operation S1203; or if the target data is not stored in the correspondence table, determines that the local cache circuit of the target home node does not cache the target data, and the target home node performs operation S1204.

Operation S1203: The target home node sends a first completion message to the cache node C1.

The first completion message carries the target data, and the first completion message indicates the cache node C1 to set the target data to a shared state.

It should be noted that, an objective of indicating the cache node C1 to set the target data to a shared state is to enable a cache node located in a same CPU or system as the cache node C1 to directly obtain the target data, without sending a data reading request to the home node.

Operation S1204: The target home node sends a snooping message to other cache nodes.

The snooping message is used to indicate the other cache nodes to query whether the target data is locally cached on the other cache nodes.

It should be noted that the other cache nodes are cache nodes, other than the cache node C1, in the M1 cache nodes included in the level-(S−1) cache.

Operation S1205: Each of the other cache nodes sends a response message to the target home node.

Specifically, if one cache node C2 in the other cache nodes caches the target data, a response message sent by the cache node C2 to the target home node carries the target data. If none of the other cache nodes caches the target data, each of the other cache nodes sends, to the target home node, a response message used to inform the target home node that the cache node does not cache the target data.

Operation S1206: The target home node determines whether the target data is cached in the other cache nodes.

When determining that the target data is cached in the other cache nodes, the target home node performs operation S1207; or when determining that the target data is not cached in the another cache node, the target home node performs operation S1208.

Operation S1207: The target home node sends a completion message to the cache node C1.

The completion message carries the target data, the completion message is used to request the cache node C1 to set the target data to a shared state, and updates, to the target data, data that corresponds to the data reading address and that is in the table of the correspondence between data and a storage address.

In one embodiment, if the cache circuit of the target home node does not have sufficient storage space to store the target data, the target data is stored to the storage space corresponding to the data reading address in the storage node.

Operation S1208: If the N1 home nodes included in the level-S cache are end nodes, the target home node sends a second completion message to the cache node C1.

The second completion message carries the data, corresponding to the data reading address, of the target home node. The target home node may obtain, based on the table of the correspondence between data and a storage address, the data corresponding to the data reading address.

Figure 13:
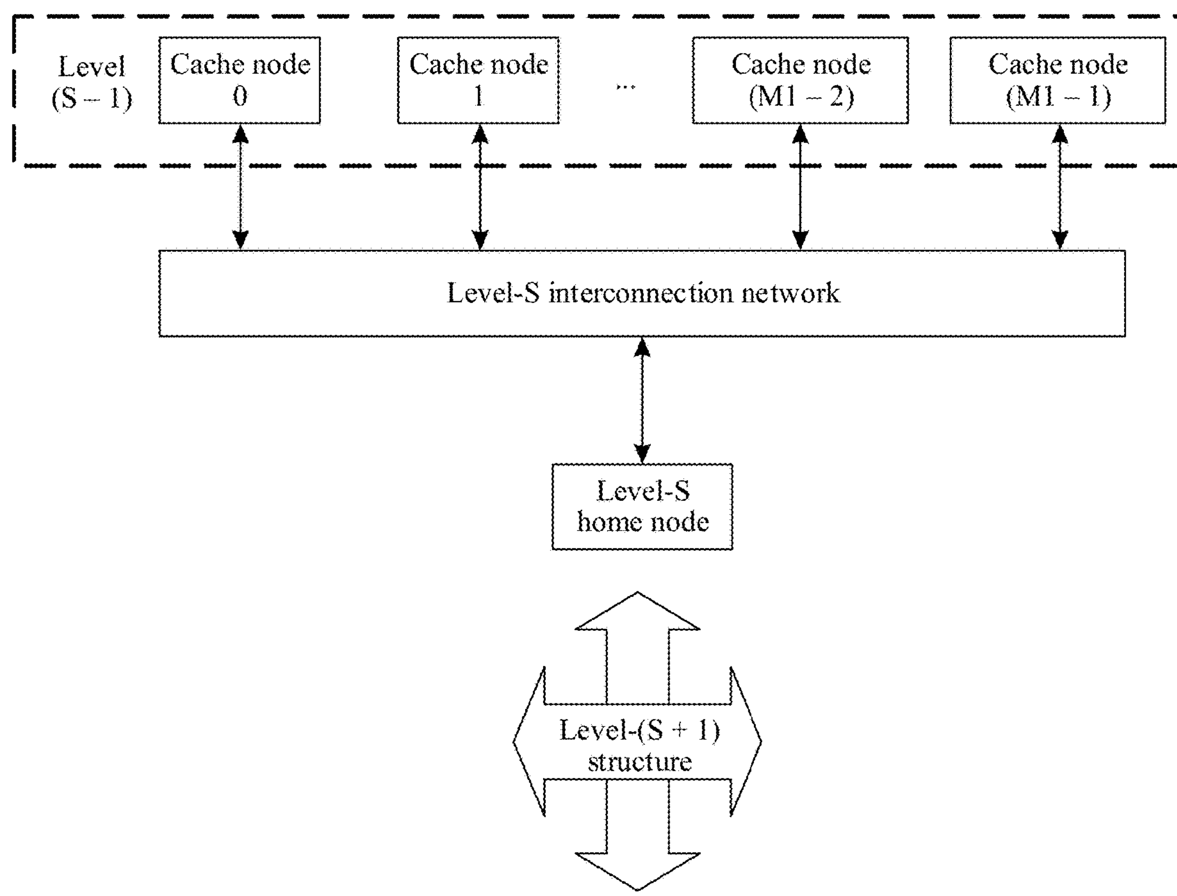
FIG. 13 is a schematic diagram of a multi-core system with a multi-level structure.

Further, if there is a next-level cache (that is, a level-(S+1) cache), for example, a multi-level structure shown in FIG. 13, when the target home node does not obtain the target data from the M1 cache nodes (that is, the level-(S−1) cache), the target home node sends a data reading request to the level-(S+1) cache, to request to obtain the target data.

It should be noted that, if the level-(S+1) cache exists, the level-S cache may be cache nodes, and the level-(S+1) cache may be a home node.

When receiving the data reading request, the home node in the level-(S+1) cache first determines whether the home node locally stores the target data. If locally storing the target data, the home node broadcasts a snooping message to cache nodes maintained by the cache node, to request to obtain the target data. If the home node in the level-(S+1) cache receives target data sent by the cache nodes maintained by the home node, the home node sends, to the target home node, a response message carrying the target data.

The target home node receives the response message sent by the level-(S+1) cache, and forwards the response message to the cache node C1.

In one embodiment, if the response message carries the target data, the target home node adds both the target data and the data reading address to the table, of the correspondence between data and a storage address, in the local storage circuit of the target home node as required.

Embodiment 5

Figure 14:
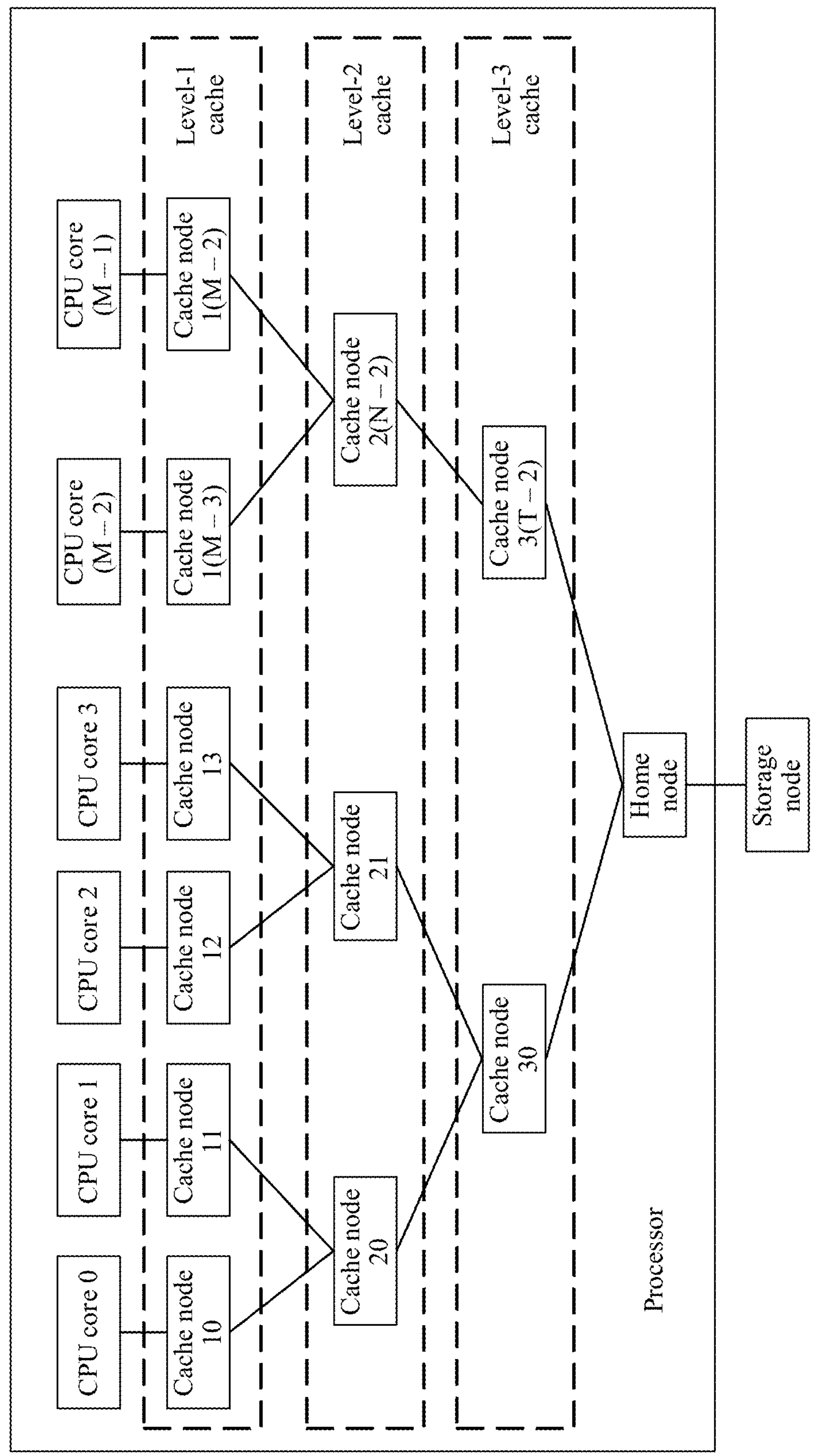
FIG. 14 is a schematic diagram of a framework of a processor scenario according to an embodiment of this application.

Based on the foregoing embodiments, this embodiment of this application provides a processor. FIG. 14 is a schematic diagram of a hardware framework of the processor. The processor includes a plurality of CPU cores, a plurality of cache nodes, and a home node, where M is an integer greater than 1. The cache node and the home node each include a cache and a cache control circuit that are in the processor. The home node is configured to maintain data coherence between the plurality of cache nodes, and the home node also manages a storage node. Data is exchanged through cache buses between the cache nodes and the CPU core, between the cache nodes, and between the cache nodes and the home node.

In one embodiment, the processor may further include a storage medium (for example, a DDR) with a speed lower than that of a cache. In practice, the storage medium with the lower speed may alternatively be located outside the processor and used as an off-chip storage medium, for example, located on the storage node in FIG. 14. The storage node and the processor are not on a same chip.

The plurality of cache nodes may be classified into a level-1 cache, a level-2 cache, and a level-3 cache.

The level-1 cache includes M cache nodes, the M cache nodes are connected to M CPU cores respectively, the level-2 cache includes N cache nodes, and the N cache nodes may be configured to maintain cache coherence between the cache nodes in the level-1 cache. Therefore, the cache nodes in the level-2 cache may be considered as home nodes of the cache nodes in the level-1 cache, where N is an integer less than M. As shown in FIG. 14, one cache node in the level-2 cache may maintain cache coherence between two cache nodes in the level-1 cache. For example, a cache node 20 may be considered as a home node of a cache node 10 and a cache node 11, and a cache node 21 may be considered as a home node of a cache node 12 and a cache node 13. Certainly, one cache node in the level-2 cache may alternatively maintain cache coherence between another quantity of cache nodes in the level-1 cache. A value of the another quantity may be 3, 4, 5, or the like, and is not limited in this application.

The level-3 cache includes t cache nodes, and the t cache nodes may be configured to maintain cache coherence between the cache nodes in the level-2 cache. Therefore, the cache nodes in the level-3 cache may be considered as home nodes of the cache nodes in the level-2 cache. t is an integer less than n. As shown in FIG. 14, one cache node in the level-3 cache may maintain cache coherence between two cache nodes in the level-2 cache. For example, the cache node 30 may be considered as a home node of the cache node 20 and the cache node 21. Certainly, one cache node in the level-2 cache may alternatively maintain cache coherence between another quantity of cache nodes in the level-1 cache. A value of the another quantity may be 3, 4, 5, or the like, and is not limited in this application.

The home node in FIG. 14 is a management center of cache buses of the plurality of cache nodes, and is configured to maintain cache coherence between the plurality of cache nodes (including the cache nodes in the level-1 cache, the level-2 cache, and the level-3 cache). The home node further includes a controller, configured to control and manage the storage medium. The home node may also be understood as a next-level cache (that is, a level-4 cache) of the level-3 cache.

If the cache node is classified into a level-1 cache, a level-2 cache, a level-3 cache, and a level-4 cache, the home node in FIG. 14 may be understood as a level-5 cache.

For the cache node in FIG. 14, an input interface is a logical or physical interface, and an output interface is a logical or physical interface. An input interface/output interface of a cache node in the level-1 cache is configured to connect a CPU core and a cache node in the level-2 cache that are shown in FIG. 14, an input interface/output interface of a cache node in the level-2 cache is configured to connect a cache node in the level-1 cache and a cache node in the level-3 cache that are shown in FIG. 14, and an input interface/output interface of a cache node in the level-3 cache is configured to connect a cache node in the level-2 cache and the home node that are shown in FIG. 14. In addition, all input interfaces of a cache node are coupled to an internal receiving circuit of the cache node, and are configured to receive data or messages sent by a CPU core, another cache node, and the home node. All output interfaces of the cache node are coupled to an internal sending circuit of the cache node, and are configured to send data or a message to a CPU core, another cache node, and the home node.

In a specific embodiment, as shown in FIG. 14, if a CPU core 0 requires data D, the cache node 10 corresponding to the CPU core 0 sends a data reading request to a home node of the cache node 10 (that is, the cache node 20). The cache node 20 is the home node of the cache node 10 and the cache node 11. After receiving the data reading request, the cache node 20 first determines whether a local cache circuit of the cache node 20 stores data D. If the cache circuit of the cache node 20 stores the data D, the cache node 20 directly sends the data D to the cache node 10. If the cache circuit of the cache node 20 does not store the data D, the cache node 20 broadcasts a snooping message to cache nodes maintained by the cache node 20 (to be specific, the cache node 10 and the cache node 11). The snooping message is used to request to obtain the data D. The cache node 11 sends a snooping response message to the cache node 20.

If the local cache circuit of the cache node 11 stores the data D, the snooping response message sent by the cache node 11 to the cache node 20 carries the data D. After receiving the snooping response message from the cache node 11, the cache node 20 sends a response message to the cache node 10. The response message carries the data D.

If the local cache circuit of the cache node 11 does not store the data D, after receiving the snooping response message from the cache node 11, the cache node 20 forwards a data reading request to a lower-level node (to be specific, a cache node 30) of the cache node 20. The cache node 30 is a home node of the cache node 20 and the cache node 21. After receiving the data reading request, the cache node 30 determines whether a local cache circuit of the cache node 30 stores the data D. If the data D is stored, the cache node 30 sends, to the cache node 20, a response message carrying the data D. If the local cache circuit of the cache node 30 does not store the data D, the local cache circuit broadcasts a snooping message to cache nodes maintained by the local cache circuit (to be specific, the cache node 20 and the cache node 21), to request the data D.

After receiving the snooping message from the cache node 30, the cache node 21 determines whether a local cache circuit of the cache node 21 stores the data D. If the cache node 21 determines that the local cache circuit of the cache node 21 stores the data D, the cache node 21 sends, to the cache node 30, a snooping response message carrying the data D 30. If the cache node 21 determines that the local cache circuit of the cache node 21 does not store the data D, the cache node 21 broadcasts a snooping message to cache nodes maintained by the cache node 21 (to be specific, the cache node 12 and the cache node 13), to request to obtain the data D. The cache node 21 receives a snooping response message sent by a cache node maintained by the cache node 21. If the snooping response message carries the data D, the cache node 21 sends, to the cache node 30, a response message carrying the data D. If the snooping response message received by the cache node 21 does not carry the data D, the cache node 21 determines that the cache circuit of the cache node maintained by the cache node 21 does not store the data D, and sends, to the cache node 30, a response message used to inform that the data D is not obtained.

If the cache node 30 obtains the data D, the cache node 30 sends, to the cache node 20, a response message carrying the data D. If the cache node 30 does not obtain the data D, the cache node 30 sends, to the cache node 20, a response message used to inform that the data D is not obtained. If the cache node 20 obtains the data D, the cache node 20 sends, to the cache node 10, a response message carrying the data D. If the cache node 20 does not obtain the data D, the cache node 20 sends, to the cache node 10, a response message used to inform that the data D is not obtained.

It should be noted that the cache node 10, the cache node 11, the cache node 12, and the cache node 13 may be considered as the level-(S−1) cache in FIG. 11 or FIG. 13, and the cache node 20 and the cache node 21 may be considered as the level-S cache in FIG. 11 or FIG. 13. The cache node 20 may be considered as the home node of the cache node 10 and the cache node 11, and the cache node 21 may be considered as the home node of the cache node 12 and the cache node 13. The cache node 30 may be considered as the level-(S+1) cache in FIG. 10, and the cache node 30 is the home node of the cache node 20 and the cache node 21.

It should be noted that the cluster computing system shown in FIG. 10 may read data according to the method, and details are not described herein again.

In one embodiment, this embodiment of this application provides a data prefetching system. The data prefetching system includes a home node and a plurality of cache nodes. The plurality of cache nodes include a cache node 1 and a cache node 2. For specific operations performed by the cache node 1, the cache node 2, and the home node, refer to related descriptions in the embodiment shown in FIG. 6. Details are not described herein again.

Embodiment 6

Figure 15:
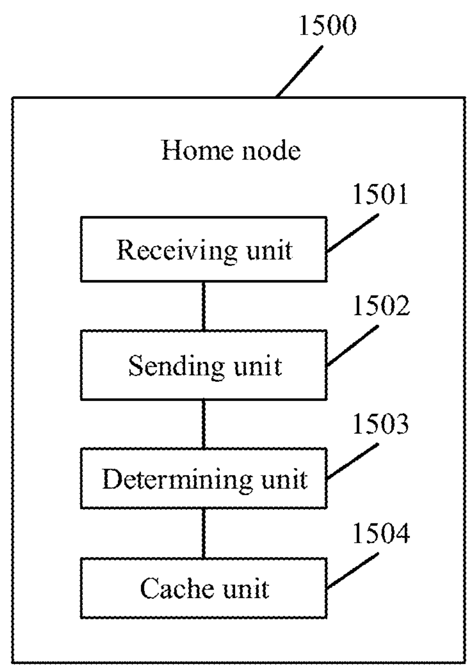
FIG. 15 is a schematic structural diagram of a home node according to an embodiment of this application.

Based on the foregoing embodiments, this embodiment of this application provides a home node. FIG. 15 is a schematic structural diagram of the home node. The home node is applied to a data prefetching system, and the data prefetching system further includes a plurality of cache nodes. As shown in FIG. 15, the home node 1500 includes:

a receiving unit 1501, configured to receive a write request sent by a cache node 1 after the cache node 1 processes received data, where the write request carries to-be-written data, a data prefetching identifier, and a data prefetching node number; and the to-be-written data is data obtained after the cache node 1 processes the received data;

a sending unit 1502, configured to send, based on the data prefetching identifier, a first snooping message to a cache node 2 indicated by the data prefetching node number, where the first snooping message carries a prefetching inquiry identifier, and the prefetching inquiry identifier is used to indicate the cache node 2 to perform an operation of determining whether the cache node 2 needs to perform a data prefetching operation on the to-be-written data; and the cache node 1 and the cache node 2 are two different nodes in the plurality of cache nodes; where the receiving unit 1501 is further configured to receive a first snooping response message sent by the cache node 2, where the first snooping response message includes indication information used to indicate whether the cache node 2 needs to perform the data prefetching operation on the to-be-written data, and the first snooping response message is sent after the cache node 2 determines, based on the prefetching inquiry identifier, whether the data prefetching operation needs to be performed on the to-be-written data; and a determining unit 1503, configured to determine, based on the indication information, whether the cache node 2 needs to perform a data prefetching operation on the to-be-written data.

The sending unit 1502 is further configured to: if the determining unit 1503 determines, based on the indication information, that the cache node 2 needs to perform the data prefetching operation on the to-be-written data, send, to the cache node 2, a response message carrying the to-be-written data.

In one embodiment, the indication information is a first prefetching result identifier included in the first snooping response message, and different values of the first prefetching result identifier are used to indicate whether the cache node 2 needs to perform the data prefetching operation on the to-be-written data (for example, when a value of the first prefetching result identifier is a first preset threshold, it indicates that the cache node 2 needs to perform the data prefetching operation on the to-be-written data; when a value of the second prefetching result identifier is a second preset threshold, it indicates that the cache node 2 does not need to perform the data prefetching operation on the to-be-written data). Alternatively, the indication information is information indicating, depending on whether the first snooping response message includes a second prefetching result identifier, whether the cache node 2 needs to perform the data prefetching operation on the to-be-written data (for example, when the first snooping response message includes the second prefetching result identifier, it indicates that the cache node 2 needs to perform the data prefetching operation on the to-be-written data; when the first snooping response message does not include a second prefetching result identifier, it indicates that the cache node 2 does not need to perform the data prefetching operation on the to-be-written data).

In one embodiment, the data prefetching system further includes a plurality of computing nodes, and the plurality of computing nodes one-to-one correspond to the plurality of cache nodes.

A computing node corresponding to the cache node 1 is configured to perform a first operation on received data, and a computing node corresponding to the cache node 2 is configured to perform a second operation on the received data. There is a high probability that the second operation is performed on the received data after the first operation is performed on the received data.

In one embodiment, the data prefetching system further includes a storage node, the write request further includes a data write address, and the data write address is a storage address that is in the storage node when to-be-written data is written to the storage node. The home node further includes:

a cache unit 1504, configured to: when the determining unit 1503 determines, based on the indication information, that the cache node 2 does not need to perform a data prefetching operation on the to-be-written data, cache the to-be-written data and the data write address into a cache of the home node.

In one embodiment, the sending unit 1502 is further configured to: when sending the first snooping message to the cache node 2, send a second snooping message to another cache node. The second snooping message is used to indicate the another cache node to delete raw data. The raw data is data corresponding to the data write address before the home node receives the to-be-written data. The another cache node is a cache node in the plurality of cache nodes except the cache node 1 and the cache node 2.

In one embodiment, the sending unit 1502 is further configured to: when sending the response message to the cache node 2, send a completion message to the cache node 1. The completion message is used to inform the cache node 1 that data writing is completed.

It should be noted that a person skilled in the art may understand that, due to hardware limitation, it is usually impossible to implement 100% simultaneity. Therefore, "simultaneously" in this application does not mean that there is no time difference, but that there is a comparatively small time difference, to ensure that two messages are sent simultaneously as much as possible. In this way, the messages can be transferred to a peer end as soon as possible, to reduce a delay. Specifically, the time difference may be one or more instruction cycles. In addition, a sequence of sending the two messages is not limited either. For example, the home node sends the response message before sending the completion message. Alternatively, the home node sends the completion message before sending the response message.

In one embodiment, the data prefetching system further includes a storage node, and the sending unit 1502 is further configured to:

send a data update message to the storage node, to update the to-be-written data to storage space in the storage node that corresponds to the data write address, where the data update message carries the to-be-written data.

In one embodiment, the data prefetching system is a processor, and the cache node and the home node each include a cache and a cache control circuit that are in the processor. The home node exchanges data with the cache node through a cache bus. In terms of a protocol, the home node exchanges data with the cache node based on a cache coherence protocol (such as the MSI protocol and the MSIF protocol).

Further, the computing node can be a core in the processor, for example, an ARM core or an x86 core.

In one embodiment, the data prefetching system is a cluster computing system, the cluster computing system includes a plurality of processing servers and a storage server, the cache node includes a memory controller and a memory (for example, a DDR controller and a DDR storage medium) that are in a processing server, and the home node includes a processor and a memory that are in the storage server.

Further, the computing node can be a processor of a processing server.

It should be noted that the receiving unit 1501 is configured to perform related content of operation S601 in the embodiment shown in FIG. 6, the sending unit 1502 is configured to perform related content of operations S602 and S604 in the embodiment shown in FIG. 6, and the receiving unit 1501 and the determining unit 1503 are configured to perform related content of operation S603 in the embodiment shown in FIG. 6.

In an example, positions of the receiving unit 1501 and the sending unit 1502 correspond to those of the input/output interface 901 and the transceiver 902 in FIG. 9, a position of the determining unit 1503 corresponds to that of the cache control circuit 904 in FIG. 9, and a position of the cache unit 1504 corresponds to the high-speed storage medium 903 in FIG. 9. In other words, functions of the receiving unit 1501 and the sending unit 1502 may be implemented by the input/output interface 901 and the transceiver 902 in FIG. 9, a function of the determining unit 1503 may be implemented by the cache control circuit 904 in FIG. 9, and a function of the cache unit 1504 may be implemented by the high-speed storage medium 903 in FIG. 9. Certainly, this application is not limited thereto.

Embodiment 7

Figure 16:
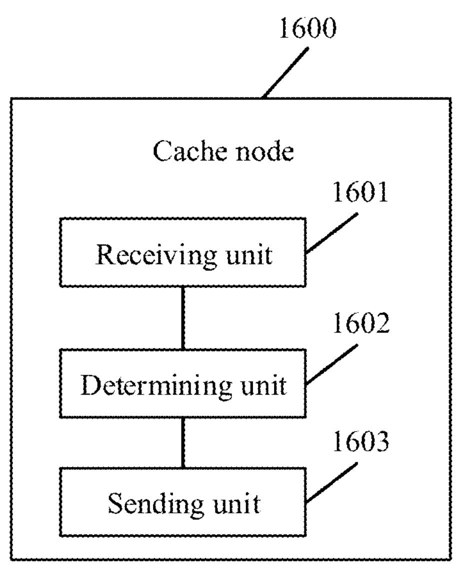
FIG. 16 is a schematic structural diagram of a cache node according to an embodiment of this application.

Based on the foregoing embodiments, this embodiment of this application provides a cache node. FIG. 16 is a schematic structural diagram of the cache node. The cache node is applied to a data prefetching system, and the data prefetching system further includes a home node and a plurality of other cache nodes. As shown in FIG. 16, the cache node 1600 includes:

a receiving unit 1601, configured to receive a first snooping message sent by the home node, where the first snooping message carries a prefetching inquiry identifier, the prefetching inquiry identifier is used to indicate the cache node to perform an operation of determining whether a data prefetching operation needs to be performed on to-be-written data, the to-be-written data is data obtained after a cache node 1 processes received data, and the cache node 1 is one of the plurality of other cache nodes;

a determining unit 1602, configured to determine, based on the prefetching inquiry identifier, whether the cache node needs to perform the data prefetching operation on the to-be-written data; and a sending unit 1603, configured to send a first snooping response message to the home node, where the first snooping response message includes indication information used to indicate whether the cache node needs to perform the data prefetching operation on the to-be-written data.

The receiving unit 1601 is further configured to: if the determining unit 1602 determines that the cache node 2 needs to perform the data prefetching operation on the to-be-written data, after the first snooping response message is sent to the home node, receive a response message sent by the home node, where the response message carries the to-be-written data.

In one embodiment, the data prefetching system further includes a plurality of computing nodes, and the plurality of computing nodes one-to-one correspond to the plurality of cache nodes.

A computing node corresponding to the cache node 1 is configured to perform a first operation on received data, and a computing node corresponding to the cache node is configured to perform a second operation on the received data. There is a high probability that the second operation is performed on the received data after the first operation is performed on the received data.

In one embodiment, the determining unit 1602 is specifically configured to: if the cache node supports a data prefetching function and requires the to-be-written data, determine that the cache node needs to perform the data prefetching operation on the to-be-written data; or if the cache node supports a data prefetching function but does not require the to-be-written data, or the cache node does not support a data prefetching function, determine that the cache node does not need to perform the data prefetching operation on the to-be-written data.

In one embodiment, the indication information is a first prefetching result identifier included in the first snooping response message, and different values of the first prefetching result identifier are used to indicate whether the cache node needs to perform the data prefetching operation on the to-be-written data (for example, when a value of the first prefetching result identifier is a first preset threshold, it indicates that the cache node needs to perform the data prefetching operation on the to-be-written data; when a value of the second prefetching result identifier is a second preset threshold, it indicates that the cache node does not need to perform the data prefetching operation on the to-be-written data). Alternatively, the indication information is information indicating, depending on whether the first snooping response message includes a second prefetching result identifier, whether the cache node needs to perform the data prefetching operation on the to-be-written data (for example, when the second snooping response message includes the second prefetching result identifier, it indicates that the cache node needs to perform the data prefetching operation on the to-be-written data; when the second snooping response message does not include a second prefetching result identifier, it indicates that the cache node does not need to perform the data prefetching operation on the to-be-written data).

In one embodiment, the data prefetching system is a processor, and the cache node and the home node each include a cache and a cache control circuit that are in the processor. The home node exchanges data with the cache node through a cache bus. In terms of a protocol, the home node exchanges data with the cache node based on a cache coherence protocol (such as the MSI protocol and the MSIF protocol).

Further, the computing node can be a core in the processor, for example, an ARM core or an x86 core.

In one embodiment, the data prefetching system is a cluster computing system, the cluster computing system includes a plurality of processing servers and a storage server, the cache node includes a memory controller and a memory (for example, a DDR controller and a DDR storage medium) that are in a processing server, and the home node includes a processor and a memory that are in the storage server.

Further, the computing node can be a processor of a processing server.

It should be noted that the receiving unit 1601, the determining unit 1602, and the sending unit 1603 are configured to perform related content in the embodiment shown in FIG. 6.

In an example, positions of the receiving unit 1601 and the sending unit 1602 correspond to those of the input/output interface 801 and the transceiver 802 in FIG. 8, and a position of the determining unit 1602 corresponds to that of the cache control circuit 804 in FIG. 8. In other words, functions of the receiving unit 1601 and the sending unit 1603 may be implemented by the input/output interface 801 and the transceiver 802 in FIG. 8, and a function of the determining unit 1602 may be implemented by the cache control circuit 804 in FIG. 8. Certainly, this application is not limited thereto.

Embodiment 8

Figure 17:
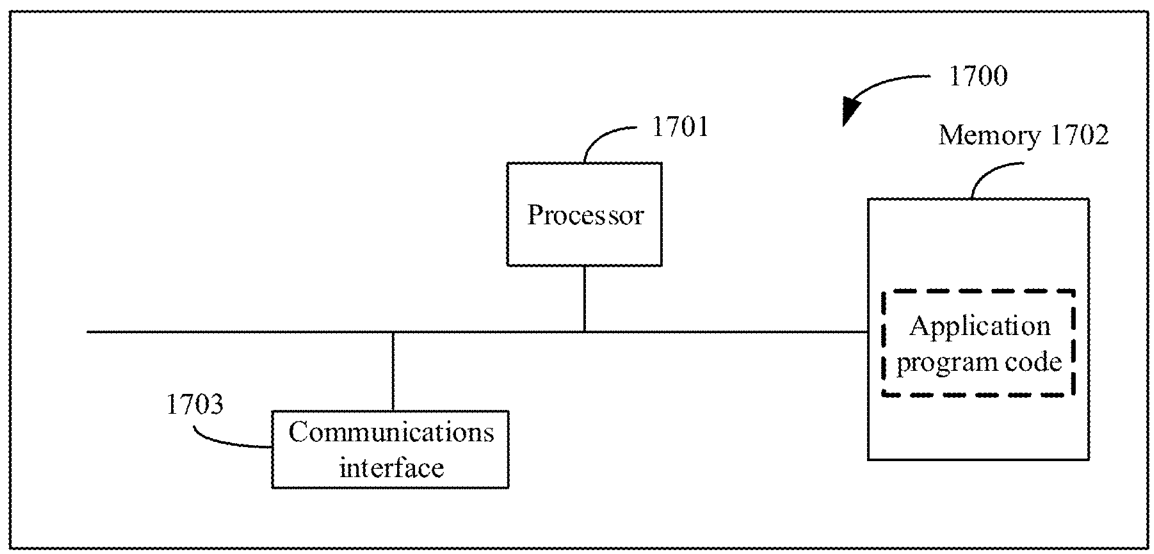
FIG. 17 is a schematic structural diagram of a data prefetching device according to an embodiment of this application.

Based on the foregoing embodiments, this embodiment provides a device. FIG. 17 is a schematic structural diagram of the device according to this embodiment of this application. The device 1700 includes at least one processor 1701, at least one memory 1702, and at least one communications interface 1703. The processor 1701, the memory 1702, and the communications interface 1703 are connected and communicate with each other through the communications bus.

The processor 1701 may be a general-purpose CPU, a microprocessor, an application-specific integrated circuit (ASIC), or one or more integrated circuits configured to control program execution of the foregoing solutions.

The communications interface 1703 is configured to communicate with another device or a communications network, such as the Ethernet, a radio access network (RAN), or a wireless local area network (WLAN).

The memory 1702 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a blue-ray optical disc, or the like), a magnetic disk storage medium or another magnetic storage device, or any other computer-accessible medium that can be used to carry or store expected program code in an instruction form or in a data structure form. The memory 1702 is limited thereto. The memory may exist independently, and is connected to the processor through a bus. Alternatively, the memory may be integrated with the processor.

The memory 1702 is configured to store application program code for executing the foregoing solutions, and the processor 1701 controls execution. The processor 1701 is configured to execute the application program code stored in the memory 1702.

The code stored in the memory 1702 can execute the foregoing data prefetching method. The method specifically includes: receiving, by a cache node 2, a first snooping message sent by a home node, where the first snooping message carries a prefetching inquiry identifier, the prefetching inquiry identifier is used to indicate the cache node 2 to perform an operation of determining whether a data prefetching operation needs to be performed on to-bewritten data, the to-be-written data is data obtained after the cache node 1 processes received data, and the cache node 1 and the cache node 2 are two different nodes in the plurality of cache nodes; determining, by the cache node 2 based on the prefetching inquiry identifier, whether the cache node 2 needs to perform the data prefetching operation on the to-be-written data; sending a first snooping response message to the home node, where the first snooping response message includes indication information used to indicate whether the cache node 2 needs to perform the data prefetching operation on the to-be-written data; and if the cache node 2 determines that the cache node 2 needs to perform the data prefetching operation on the to-be-written data, after the cache node 2 sends the first snooping response message to the home node, receiving a response message sent by the home node, where the response message carries the to-be-written data.

Alternatively, the code stored in the memory 1702 can execute the foregoing another data prefetching method. The method specifically includes: receiving, by a home node, a write request sent by a cache node 1 after cache node 1 processes the received data, where the write request carries to-be-written data, a data prefetching identifier, and a data prefetching node number; sending, by the home node based on the data prefetching identifier, a first snooping message to a cache node 2 indicated by the data prefetching node number, where the first snooping message carries a prefetching inquiry identifier, and the prefetching inquiry identifier is used to indicate the cache node 2 to perform an operation of determining whether the cache node 2 needs to perform a data prefetching operation on the to-be-written data; receiving, by the home node, a first snooping response message sent by the cache node 2, where the first snooping response message includes indication information used to indicate whether the cache node 2 needs to perform the data prefetching operation on the to-be-written data; and when the home node determines that the cache node 2 needs to perform the data prefetching operation on the to-be-written data, sending, by the home node to the cache node 2, a response message carrying the to-be-written data. The cache node 1 and the cache node 2 are two different nodes in the plurality of cache nodes.

The foregoing descriptions about the implementations allow a person skilled in the art to clearly understand that, for the purpose of convenient and brief description, division into the foregoing function modules is taken as an example for illustration. In actual application, the foregoing functions can be allocated to different modules and implemented as required, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, may be located in one place, or may be distributed in a plurality of different places. Some or all of the units may be selected based on actual requirements to achieve the objectives of the solutions of the embodiments.

In addition, the functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the foregoing methods provided in the embodiments of this application may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data prefetching method, comprising:

receiving, by a home node of a data prefetching system having a plurality of cache nodes, a write request sent by a first cache node of the plurality of cache nodes, wherein the write request comprises to-be-written data, a data prefetching identifier, and a data prefetching node number;

sending, by the home node based on the data prefetching identifier, a first snooping message to a second cache node of the plurality of cache nodes indicated by the data prefetching node number, wherein the first snooping message comprises a prefetching inquiry identifier, wherein the prefetching inquiry identifier is used to indicate to the second cache node whether to perform an operation of: determining whether a data prefetching operation needs to be performed on the to-be-written data;

receiving, by the home node, a first snooping response message sent by the second cache node, wherein the first snooping response message comprises indication information, which includes a first prefetching result identifier comprised in the first snooping response message, wherein different values of the first prefetching result identifier are used to indicate whether the second cache node needs to perform the data prefetching operation on the to-be-written data, wherein the indication information includes information indicating, depending on whether the first snooping response message comprises a second prefetching result identifier, whether the second cache node needs to perform the data prefetching operation on the to-be-written data; and in response to determining, by the home node, based on the indication information, that the second cache node needs to perform the data prefetching operation on the to-be-written data, sending, by the home node to the second cache node, a response message carrying the to-be-written data; wherein the first cache node and the second cache node are two different nodes in the plurality of cache nodes.

2. The method according to claim 1, wherein the data prefetching system further comprises a plurality of computing nodes, and the plurality of computing nodes one-to-one correspond to the plurality of cache nodes; and a computing node corresponding to the first cache node is configured to perform a first operation on received data, and a computing node corresponding to the second cache node is configured to perform a second operation on the received data, wherein a probability is greater than a threshold that the second operation is performed on the received data in response to the first operation being performed on the received data.

3. The method according to claim 2, wherein the data prefetching system further comprises a storage node, the write request further comprises a data write address, and the data write address is a storage address that is in the storage node in response to the to-be-written data being written to the storage node; and the method further comprises:

in response to determining, by the home node, based on the indication information, that the second cache node does not need to perform a data prefetching operation on the to-be-written data, caching, by the home node, the to-be-written data and the data write address into a cache of the home node.

4. The method according to claim 1, wherein the data prefetching system further comprises a plurality of computing nodes, and the plurality of computing nodes correspond one-to-one to the plurality of cache nodes; and a computing node corresponding to the first cache node is configured to perform a first operation on received data, and a computing node corresponding to the second cache node is configured to perform a second operation on the received data, wherein a probability is greater than a threshold that the second operation is performed on the received data in response to the first operation being performed on the received data.

5. The method according to claim 1, wherein the data prefetching system further comprises a storage node, the write request further comprises a data write address, and the data write address is a storage address that is in the storage node in response to the to-be-written data written to the storage node; and the method further comprises:

in response to determining, by the home node, based on the indication information, that the second cache node does not need to perform a data prefetching operation on the to-be-written data, caching, by the home node, the to-be-written data and the data write address into a cache of the home node.

6. The method according to claim 1, wherein the data prefetching system further comprises a storage node, the write request further comprises a data write address, and the data write address is a storage address that is in the storage node in response to the to-be-written data being written to the storage node; and the method further comprises:

in response to determining, by the home node, based on the indication information, that the second cache node does not need to perform a data prefetching operation on the to-be-written data, caching, by the home node, the to-be-written data and the data write address into a cache of the home node.

7. The method according to claim 1, wherein in response to sending, by the home node, the first snooping message to the second cache node, the method further comprises:

sending, by the home node, a second snooping message to another cache node, wherein the second snooping message is used to indicate to the another cache node to delete raw data, and the raw data is data corresponding to the data write address before the home node receives the to-be-written data; and the another cache node is a cache node in the plurality of cache nodes other than the first cache node and the second cache node.

8. The method according to claim 1, wherein in response to sending, by the home node, the response message to the second cache node, the method further comprises:

sending a completion message to the first cache node, wherein the completion message is used to inform the first cache node that data writing is completed.

9. The method according to claim 1, wherein the data prefetching system further comprises a storage node, and the method further comprises:

sending, by the home node, a data update message to the storage node, to update the to-be-written data to storage space in the storage node that corresponds to the data write address, wherein the data update message comprises the to-be-written data.

10. The method according to claim 1, wherein the first snooping response message is sent in response to the second cache node determining, based on the prefetching inquiry identifier, whether a data prefetching operation needs to be performed on the to-be-written data.

11. The method according to claim 1, wherein the data prefetching system is a processor, and the cache node and the home node each comprise a cache and a cache control circuit that are in the processor.

12. The method according to claim 1, wherein the data prefetching system is a cluster computing system, wherein the cluster computing system comprises a plurality of processing servers and a storage server, wherein the cache node comprises a memory controller and a memory that are in the processing server, and wherein the home node comprises a processor and a memory that are in the storage server.

13. A data prefetching system, comprising a home node, a plurality of cache nodes including a first cache node and a second cache node, a plurality of computing nodes corresponding to the plurality of cache nodes respectively, wherein the second cache node is configured to receive a first snooping message sent by the home node, wherein the first snooping message comprises a prefetching inquiry identifier, wherein the prefetching inquiry identifier is used to indicate to the second cache node whether to perform an operation of: determining whether a data prefetching operation needs to be performed on to-be-written data, wherein the to-be-written data is data obtained in response to the first cache node of the plurality of cache nodes that processes received data, and wherein the first cache node and the second cache node are two different nodes in the plurality of cache nodes;

determine based on the prefetching inquiry identifier, whether the second cache node needs to perform the data prefetching operation on the to-be-written data;

send a first snooping response message to the home node, wherein the first snooping response message comprises indication information used to indicate whether the second cache node needs to perform the data prefetching operation on the to-be-written data; and if the second cache node determines that the second cache node needs to perform the data prefetching operation on the to-be-written data, in response to the second cache node sending the first snooping response message to the home node, receive a response message sent, wherein the response message comprises the to-be-written data;

wherein a computing node corresponding to the first cache node is configured to perform a first operation on received data, and a computing node corresponding to the second cache node is configured to perform a second operation on the received data, wherein a probability is greater than a threshold that the second operation is performed on the received data in response to the first operation being performed on the received data.

14. The data prefetching system according to claim 13, wherein the second cache node, configured to determine based on the prefetching inquiry identifier, whether the second cache node needs to perform the data prefetching operation on the to-be-written data comprises:

if the second cache node supports a data prefetching function and requires the to-be-written data, the second cache node, configured to determine that the second cache node needs to perform the data prefetching operation on the to-be-written data; or if the second cache node supports a data prefetching function but does not require the to-be-written data, or the second cache node does not support a data prefetching function, the second cache node, configured to determine that the second cache node does not need to perform a data prefetching operation on the to-be-written data.

15. The data prefetching system according to claim 13, wherein the second cache node, configured to determine based on the prefetching inquiry identifier, whether the second cache node needs to perform the data prefetching operation on the to-be-written data comprises:

if the second cache node supports a data prefetching function and requires the to-be-written data, the second cache node, configured to determine that the second cache node needs to perform the data prefetching operation on the to-be-written data; or if the second cache node supports a data prefetching function but does not require the to-be-written data, or the second cache node does not support a data prefetching function, the second cache node, configured to determine that the second cache node does not need to perform a data prefetching operation on the to-be-written data.

16. The data prefetching system according to claim 13, wherein the indication information is a first prefetching result identifier comprised in the first snooping response message, and different values of the first prefetching result identifier are used to indicate whether the second cache node needs to perform the data prefetching operation on the to-be-written data; or the indication information is information indicating, depending on whether the first snooping response message comprises a second prefetching result identifier, whether the second cache node needs to perform the data prefetching operation on the to-be-written data.

17. The data prefetching system according to claim 13, wherein the data prefetching system is a processor, and the cache node and the home node each comprise a cache and a cache control circuit that are in the processor.

18. The data prefetching system according to claim 13, wherein the data prefetching system is a cluster computing system, wherein the cluster computing system comprises a plurality of processing servers and a storage server, wherein the cache node comprises a memory controller and a memory that are in the processing server, and wherein the home node comprises a processor and a memory that are in the storage server.

* * * * *